(12) United States Patent
Huang et al.

(10) Patent No.: US 12,204,075 B2
(45) Date of Patent: Jan. 21, 2025

(54) IMAGING LENS SYSTEM, CAMERA MODULE AND ELECTRONIC DEVICE

(71) Applicant: LARGAN PRECISION CO., LTD., Taichung (TW)

(72) Inventors: Hsuan-Chin Huang, Taichung (TW); Lin An Chang, Taichung (TW); Ming-Ta Chou, Taichung (TW); Chun-Hua Tsai, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 567 days.

(21) Appl. No.: 17/517,474

(22) Filed: Nov. 2, 2021

(65) Prior Publication Data

US 2023/0045146 A1 Feb. 9, 2023

Related U.S. Application Data

(60) Provisional application No. 63/231,063, filed on Aug. 9, 2021.

(51) Int. Cl.
*G02B 13/00* (2006.01)
*G02B 7/02* (2021.01)
*G02B 9/04* (2006.01)

(52) U.S. Cl.
CPC ........... *G02B 13/003* (2013.01); *G02B 7/021* (2013.01); *G02B 9/04* (2013.01)

(58) Field of Classification Search
CPC ......... G02B 13/003; G02B 7/021; G02B 9/04
(Continued)

(56) References Cited

U.S. PATENT DOCUMENTS 10,444,464 B2 10/2019 Lin et al.
10,498,938 B2 12/2019 Wei
(Continued)

FOREIGN PATENT DOCUMENTS

CN 210954387 U 7/2020
CN 111948792 A 11/2020
(Continued)

OTHER PUBLICATIONS

European Search Report in Application No. 21213620.4 Dated May 10, 2022.
(Continued)

*Primary Examiner* — Sharrief I Broome
(74) *Attorney, Agent, or Firm* — Maschoff Brennan

(57) ABSTRACT

An imaging lens system includes a lens barrel element and an imaging lens assembly disposed on the lens barrel element and including a first imaging lens element, a spacer element and a second imaging lens element. The spacer element has a second object-side contact surface corresponding to a first image-side contact surface of the first imaging lens element. The second imaging lens element has a third object-side contact surface corresponding to a second image-side contact surface of the spacer element. The lens barrel element and the spacer element form a buffer structure closer to an optical axis than the first image-side contact surface and including a first gap and a second gap located closer to the optical axis than the first gap. The first gap overlaps the third object-side contact surface in a direction parallel to the optical axis. A step difference is between the first and second gaps.

28 Claims, 26 Drawing Sheets

(58) Field of Classification Search
USPC .......................................................... 359/793
See application file for complete search history.

(56) References Cited

U.S. PATENT DOCUMENTS

| | | | |
|---|---|---|---|
| 10,539,804 B2 | 1/2020 | Tang et al. | |
| 10,598,890 B2 | 3/2020 | Kim et al. | |
| 10,935,801 B2 | 3/2021 | Tang et al. | |
| 2012/0162795 A1 | 6/2012 | Yoshimura | |
| 2015/0253532 A1* | 9/2015 | Lin ........................ | G02B 7/022 |
| | | | 359/601 |
| 2017/0160511 A1* | 6/2017 | Kim ........................ | G02B 7/021 |
| 2018/0081144 A1* | 3/2018 | Lin ........................ | G02B 7/021 |
| 2019/0174032 A1* | 6/2019 | Yang ..................... | G06F 1/1686 |
| 2019/0278058 A1* | 9/2019 | Chou ................. | G02B 13/0045 |
| 2020/0285029 A1* | 9/2020 | Watanabe .......... | G02B 13/0045 |
| 2021/0080697 A1 | 3/2021 | Chang et al. | |

FOREIGN PATENT DOCUMENTS

| | | |
|---|---|---|
| CN | 113126230 A | 7/2021 |
| TW | I598614 B | 9/2017 |

OTHER PUBLICATIONS

TW Office Action in Application No. 110131939 Dated Aug. 4, 2022.

\* cited by examiner

IMAGING LENS SYSTEM, CAMERA MODULE AND ELECTRONIC DEVICE

RELATED APPLICATIONS

This application claims priority to U.S. Provisional Application 63/231,063, filed on Aug. 9, 2021, which is incorporated by reference herein in its entirety.

BACKGROUND

Technical Field

The present disclosure relates to an imaging lens system, a camera module and an electronic device, more particularly to an imaging lens system and a camera module applicable to an electronic device.

Description of Related Art

With the development of semiconductor manufacturing technology, the performance of image sensors has been improved, and the pixel size thereof has been scaled down. Therefore, featuring high image quality becomes one of the indispensable features of an optical system nowadays. Furthermore, due to the rapid changes in technology, electronic devices equipped with optical systems are trending towards multi-functionality for various applications, and therefore the functionality requirements for the optical systems have been increasing.

In recent years, there is an increasing demand for electronic devices featuring compact size, but conventional optical systems are difficult to meet both the requirements of high image quality and compactness. Conventional camera modules usually have functionalities such as auto focus, optical image stabilization and optical zoom. However, in order to achieve the above functionalities, the structure of the camera modules becomes more complex and the size thereof also increases, and thus, the size of electronic devices equipped with the camera modules also increases. Generally, in a manufacturing process for optical systems, there are assembly errors between lens elements and a lens barrel, and there is usually a problem of assembly warpage so that the lens elements may be installed unevenly and thus tilts, thereby increasing defective rate of the optical systems.

SUMMARY

According to one aspect of the present disclosure, an imaging lens system includes a lens barrel element and an imaging lens assembly disposed on the lens barrel element. The imaging lens assembly includes, in order from an object side to an image side, a first imaging lens element, a spacer element and a second imaging lens element. The first imaging lens element has a first image-side contact surface. The spacer element has a second object-side contact surface and a second image-side contact surface corresponding to the first image-side contact surface. The second imaging lens element has a third object-side contact surface corresponding to the second image-side contact surface. The second imaging lens element includes a mark structure, and the mark structure is an annular tapering protrusion surrounding an optical axis of the imaging lens system. The mark structure is located closer to the optical axis than the third object-side contact surface to the optical axis. The lens barrel element and the spacer element together form a buffer structure located farther away from the optical axis than the first image-side contact surface to the optical axis. The buffer structure includes a first gap and a second gap. The first gap at least partially overlaps the third object-side contact surface in a direction parallel to the optical axis. There is a step difference between the first gap and the second gap. The second gap is located closer to the optical axis than the first gap to the optical axis. When a width of the first gap is g1, and a width of the second gap is g2, the following condition is satisfied: $0.01 \leq g1/g2 \leq 0.9$.

According to another aspect of the present disclosure, an imaging lens system includes a lens barrel element and an imaging lens assembly disposed on the lens barrel element. The imaging lens assembly includes, in order from an object side to an image side, a first imaging lens element, a spacer element and a second imaging lens element. The first imaging lens element has a first image-side contact surface. The spacer element has a second object-side contact surface and a second image-side contact surface corresponding to the first image-side contact surface. The second imaging lens element has a third object-side contact surface corresponding to the second image-side contact surface. The second imaging lens element includes a mark structure, and the mark structure is an annular tapering protrusion surrounding an optical axis of the imaging lens system. The mark structure is located closer to the optical axis than the third object-side contact surface to the optical axis. The lens barrel element and the spacer element together form a buffer structure located farther away from the optical axis than the first image-side contact surface to the optical axis. The buffer structure includes a first gap and a second gap. The first gap at least partially overlaps the third object-side contact surface in a direction parallel to the optical axis. There is a step difference between the first gap and the second gap. The second gap is located closer to the optical axis than the first gap to the optical axis. When an inner diameter of the first gap is $\Phi g1$, an outer diameter of the first image-side contact surface is $\Phi o1$, and an outer diameter of the second image-side contact surface is $\Phi o2$, the following condition is satisfied: $0.3 < (\Phi g1 - \Phi o1)/(\Phi o2 - \Phi o1) < 0.9$.

According to another aspect of the present disclosure, an imaging lens system includes a lens barrel element and an imaging lens assembly disposed on the lens barrel element. The imaging lens assembly includes, in order from an object side to an image side, a first imaging lens element, a spacer element and a second imaging lens element. The first imaging lens element has a first image-side contact surface. The spacer element is a plastic spacer element, and the spacer element is one-piece formed by injection molding process. The spacer element has a second object-side contact surface and a second image-side contact surface. The second object-side contact surface corresponds to the first image-side contact surface. The second imaging lens element has a third object-side contact surface corresponding to the second image-side contact surface. The lens barrel element and the spacer element together form a buffer structure located farther away from an optical axis of the imaging lens system than the first image-side contact surface to the optical axis. The buffer structure includes a first gap and a second gap. The first gap at least partially overlaps the third object-side contact surface in a direction parallel to the optical axis. There is a step difference between the first gap and the second gap. The second gap is located closer to the optical axis than the first gap to the optical axis. When a width of the first gap is g1, the following condition is satisfied: $g1 \leq 8$ μm.

According to another aspect of the present disclosure, a camera module includes the aforementioned imaging lens system and an image sensor. The image sensor is disposed on an image surface of the imaging lens system.

According to another aspect of the present disclosure, an electronic device includes the aforementioned camera module.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
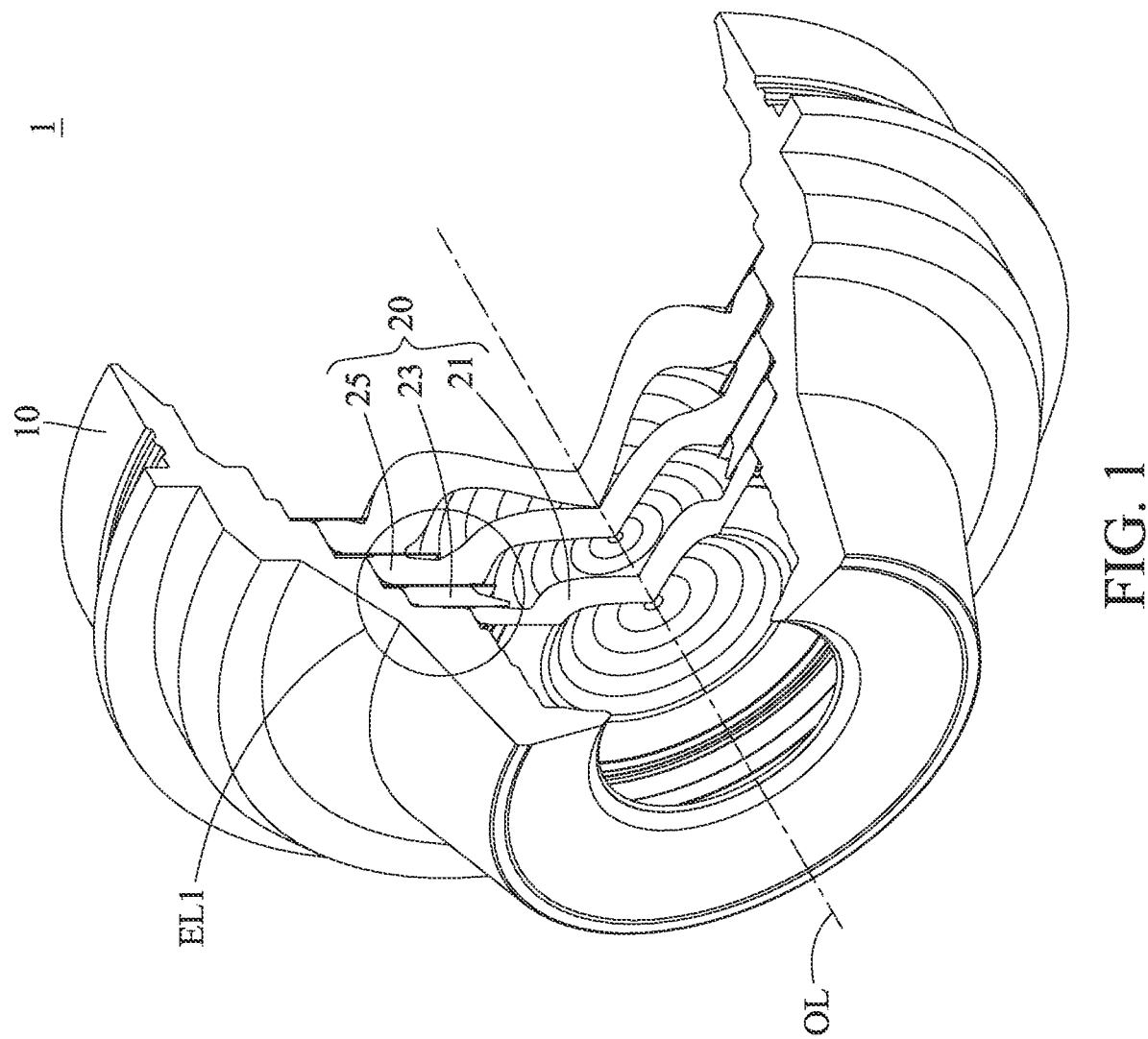
FIG. 1 is a sectional perspective view of an imaging lens system according to the 1st embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The present disclosure provides an imaging lens system. The imaging lens system includes a lens barrel element and an imaging lens assembly. The imaging lens assembly is disposed on the lens barrel element, and the imaging lens assembly includes, in order from an object side to an image side, a first imaging lens element, a spacer element and a second imaging lens element. The first imaging lens element has a first image-side contact surface. The spacer element has a second object-side contact surface and a second image-side contact surface, and the second object-side contact surface corresponds to the first image-side contact surface. The second imaging lens element has a third object-side contact surface, and the third object-side contact surface corresponds to the second image-side contact surface.

The lens barrel element and the spacer element together form a buffer structure, and the buffer structure is located farther away from an optical axis of the imaging lens system than the first image-side contact surface of the first imaging lens element to the optical axis. The buffer structure includes a first gap and a second gap. The first gap at least partially overlaps the third object-side contact surface of the second imaging lens element in a direction parallel to the optical axis. There is a step difference between the first gap and the second gap, and the second gap is located closer to the optical axis than the first gap to the optical axis.

According to the present disclosure, the arrangement of the buffer structure, imaging lens elements and spacer element in the imaging lens system is favorable for preventing the components from tilting and warpage problems, and also favorable for maintaining the axial distance between each of all adjacent imaging lens elements so as to correct aberrations, so that the actual image quality of the imaging lens system can be closer to designed image quality, thereby providing higher optical specification.

In some aspects, the spacer element can be a one-piece plastic spacer element formed by injection molding process, and the plastic spacer element has better elasticity and is relatively lightweight, thereby reducing manufacturing costs and improving mass production. Moreover, the plastic spacer element can have at least one gate trace. Moreover, the plastic spacer element can also have at least two gate traces. Therefore, it is favorable for providing the plastic spacer element higher dimensional precision. Moreover, the plastic spacer element can also include a liquid-crystal polymer, such that the spacer element has better elasticity. Therefore, it is favorable for obtaining higher molding efficiency. Moreover, the plastic spacer element can also include a glass fiber, and thus, the elasticity of the spacer element can be controlled by adjusting the mixing ratio of the glass fiber in the plastic spacer element. Therefore, it is favorable for the plastic spacer element to have better mechanical strength, so that the plastic spacer element may not have permanent deformation. Moreover, a preferable range of the percentage of the glass fiber in the plastic spacer element is between about 5% and 45%, and the glass fiber can be long glass fiber or short glass fiber according to actual molding requirements. Moreover, the plastic spacer element can further have a plurality of strip groove structures extending from the second object-side contact surface to the second image-side contact surface, and the strip groove structures are regularly arranged around the optical axis. Therefore, it is favorable for increasing the efficiency of stray light elimination.

In some aspects, the spacer element can be a metal spacer element, and the metal spacer element has better rigidity, so that the control of assembly precision can be improved. Moreover, the metal spacer element can have a V-shaped groove recessed in a direction away from the optical axis. Therefore, it is favorable for minimizing the possibility of generating non-imaging light.

At least one of the second object-side contact surface and the second image-side contact surface of the spacer element can be provided with a light blocking sheet. Therefore, the contact surfaces can be provided with light blocking sheets according to light blocking requirement.

The second imaging lens element can include a mark structure. The mark structure is an annular tapering protrusion surrounding the optical axis, and the mark structure is located closer to the optical axis than the third object-side contact surface of the second imaging lens element to the optical axis. Therefore, the area of the third object-side contact surface can be determined via the mark structure. Moreover, the mark structure can be a demolded structure formed on the second imaging lens element after the second imaging lens element is removed from a shaping mold for manufacturing the second imaging lens element. Therefore, it is favorable for controlling the surface precision of the third object-side contact surface so as to balance the stress applied on the contact surface during an assembly process. Moreover, an angle of the cross-section of the mark structure can be between 80 degrees and 100 degrees. For example, in the case of actual manufacturing, the angle is 90 degrees, but the present disclosure is not limited thereto.

When a width of the first gap is g1, and a width of the second gap is g2, the following condition can be satisfied: $0.01 \leq g1/g2 \leq 0.9$. Therefore, it is favorable for reducing the mechanical interferences between the lens barrel element and the spacer element. Please refer to FIG. 6, which shows schematic views of g1 and g2 according to the 1st embodiment of the present disclosure.

When an inner diameter of the first gap is $\Phi g1$, an outer diameter of the first image-side contact surface is $\Phi o1$, and an outer diameter of the second image-side contact surface is $\Phi o2$, the following condition can be satisfied: $0.3 < (\Phi g1 - \Phi o1)/(\Phi o2 - \Phi o1) < 0.9$. Therefore, it is favorable for enhancing the supporting capability of the spacer element. Please refer to FIG. 4, which shows schematic views of $\Phi g1$, $\Phi o1$ and $\Phi o2$ according to the 1st embodiment of the present disclosure.

When the width of the first gap is g1, the following condition can be satisfied: $g1 \leq 12$ micrometers (μm). Therefore, the tolerable range of force exerted on the lens barrel element and the spacer element during an assembly process can be increased by a narrow gap existing therebetween. Moreover, the following condition can also be satisfied: $g1 \leq 8$ μm. Therefore, it is favorable for preventing the spacer element from deforming due to overly large force exerted thereon during an assembly process. Moreover, the following condition can also be satisfied: $g1 \leq 4.5$ μm. Therefore, it is favorable for providing better buffering effect while the molding precision is properly under control. Moreover, the first gap can be even in width, and the second gap can be uneven in width, but the present disclosure is not limited thereto.

When the outer diameter of the first image-side contact surface is $\Phi o1$, and the outer diameter of the second image-side contact surface is $\Phi o2$, the following condition can be satisfied: $0.50 < \Phi o1/\Phi o2 < 0.90$. Therefore, it is favorable for improving assembling yield rate.

When the width of the first gap is g1, an inner diameter of the first image-side contact surface is $\Phi i1$, and the inner diameter of the first gap is $\Phi g1$, the following condition can be satisfied: $0.5 \leq 1000 \times g1/(\Phi g1 - \Phi i1) \leq 15$. Therefore, it is favorable for further increasing assembly structural strength. Please refer to FIG. 4, which shows a schematic view of $\Phi i1$ according to the 1st embodiment of the present disclosure.

The first image-side contact surface of the first imaging lens element can be provided with a light absorption coating layer in physical contact with the spacer element. Therefore, it is favorable for maintaining assembly precision and preventing a large angle reflective light generated on the first image-side contact surface.

The third object-side contact surface of the second imaging lens element can be provided with a light absorption coating layer in physical contact with the spacer element. Therefore, it is favorable for maintaining assembly precision and preventing a large angle reflective light generated on the third object-side contact surface.

The present disclosure provides a camera module, which includes the aforementioned imaging lens system and an image sensor. The image sensor is disposed on an image surface of the imaging lens system.

The present disclosure provides an electronic device, which includes the aforementioned camera module.

According to the present disclosure, the aforementioned features and conditions can be utilized in numerous combinations so as to achieve corresponding effects.

According to the above description of the present disclosure, the following specific embodiments are provided for further explanation.

1st Embodiment

Figure 2:
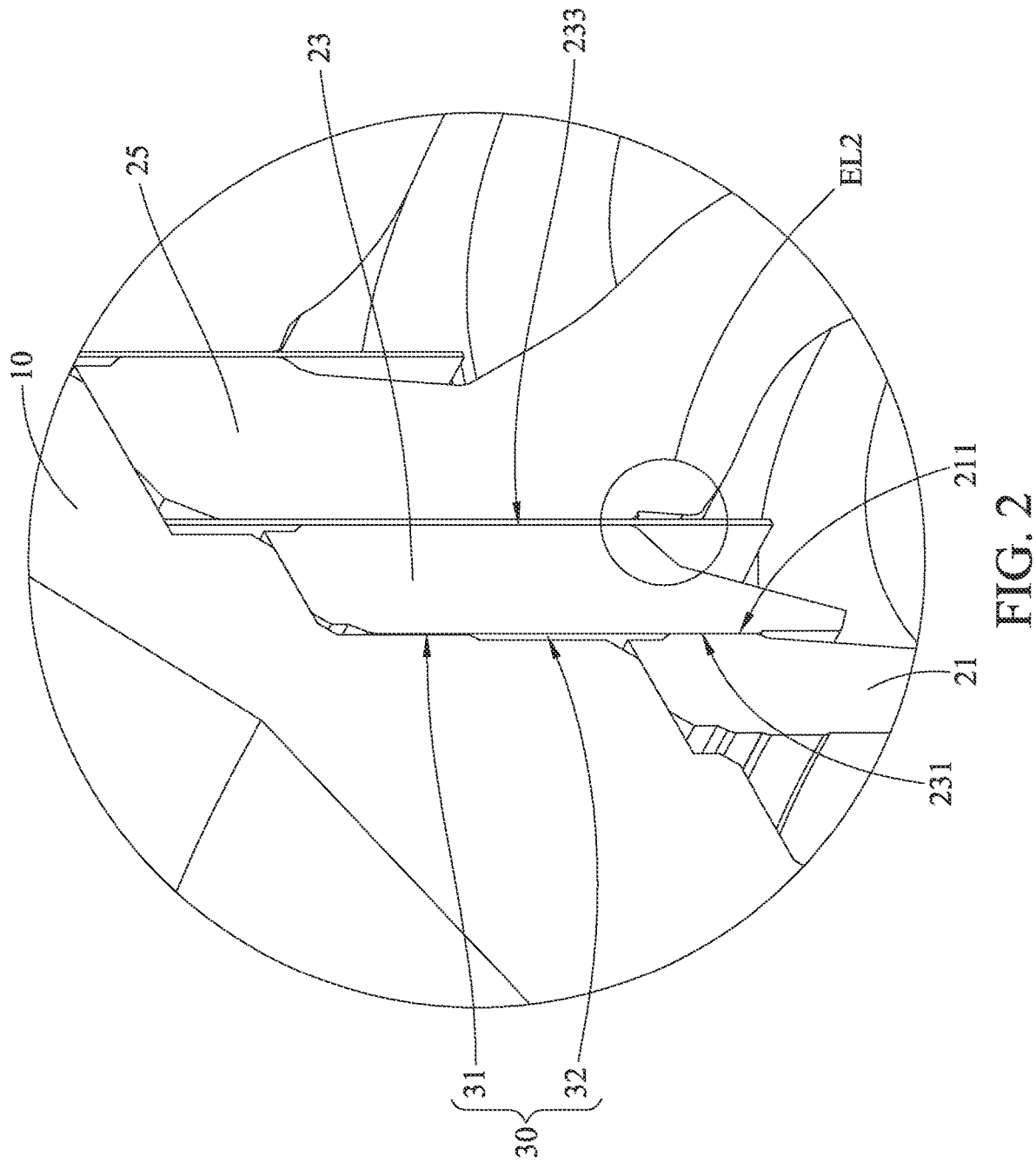
FIG. 2 is an enlarged view of region EL1 in FIG. 1.
Figure 3:
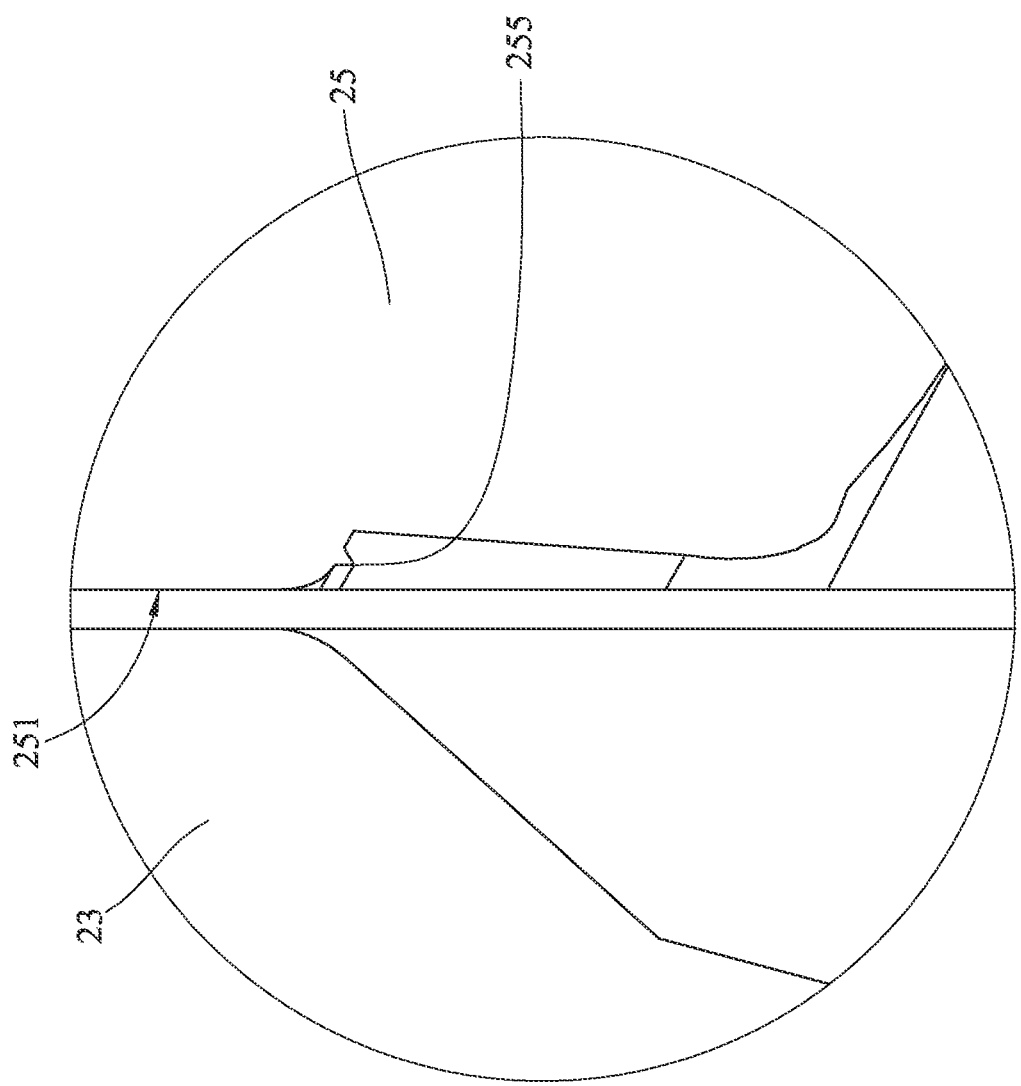
FIG. 3 is an enlarged view of region EL2 in FIG. 2.
Figure 4:
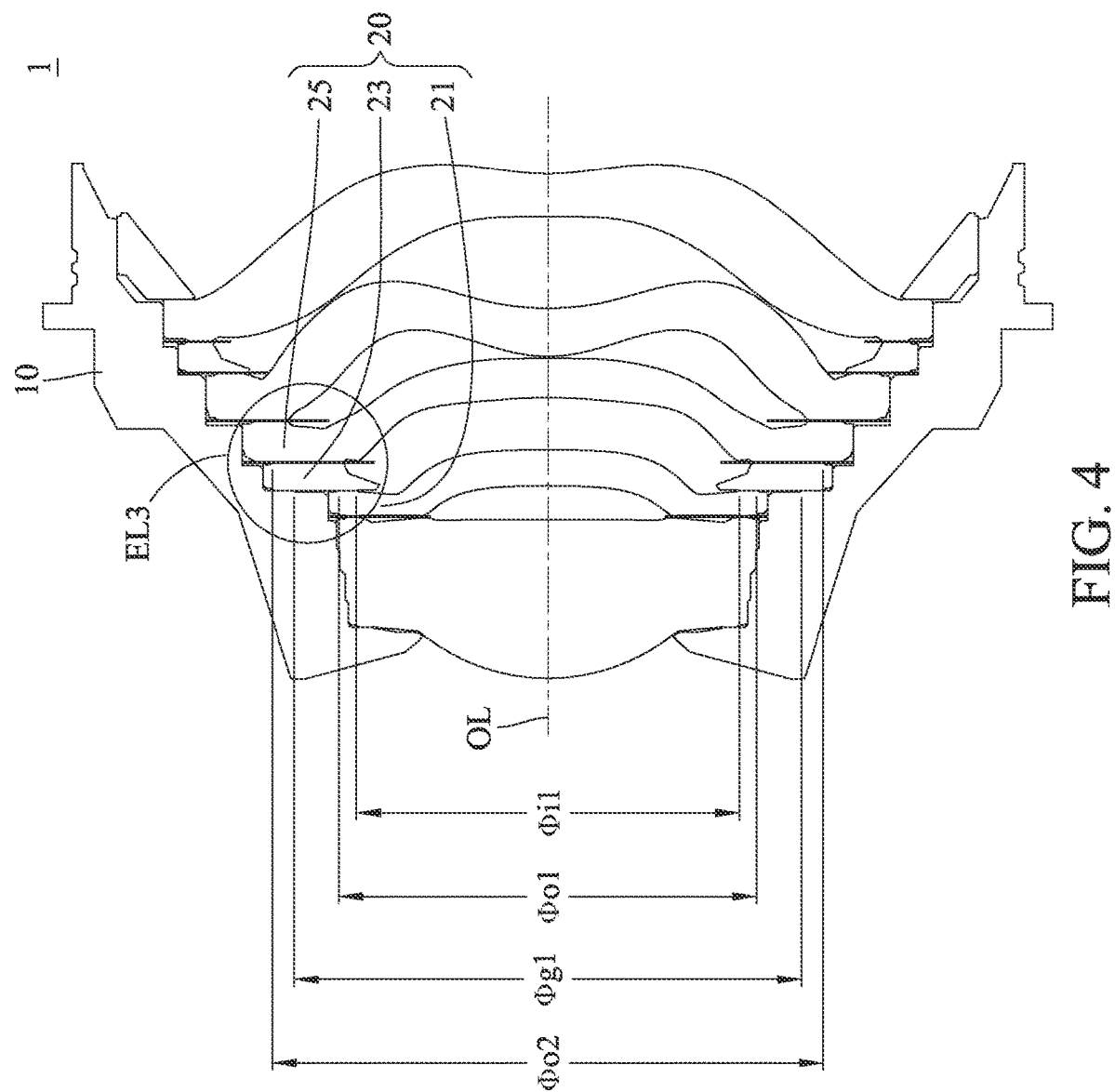
FIG. 4 is a cross-sectional view of the imaging lens system in FIG. 1.
Figure 5:
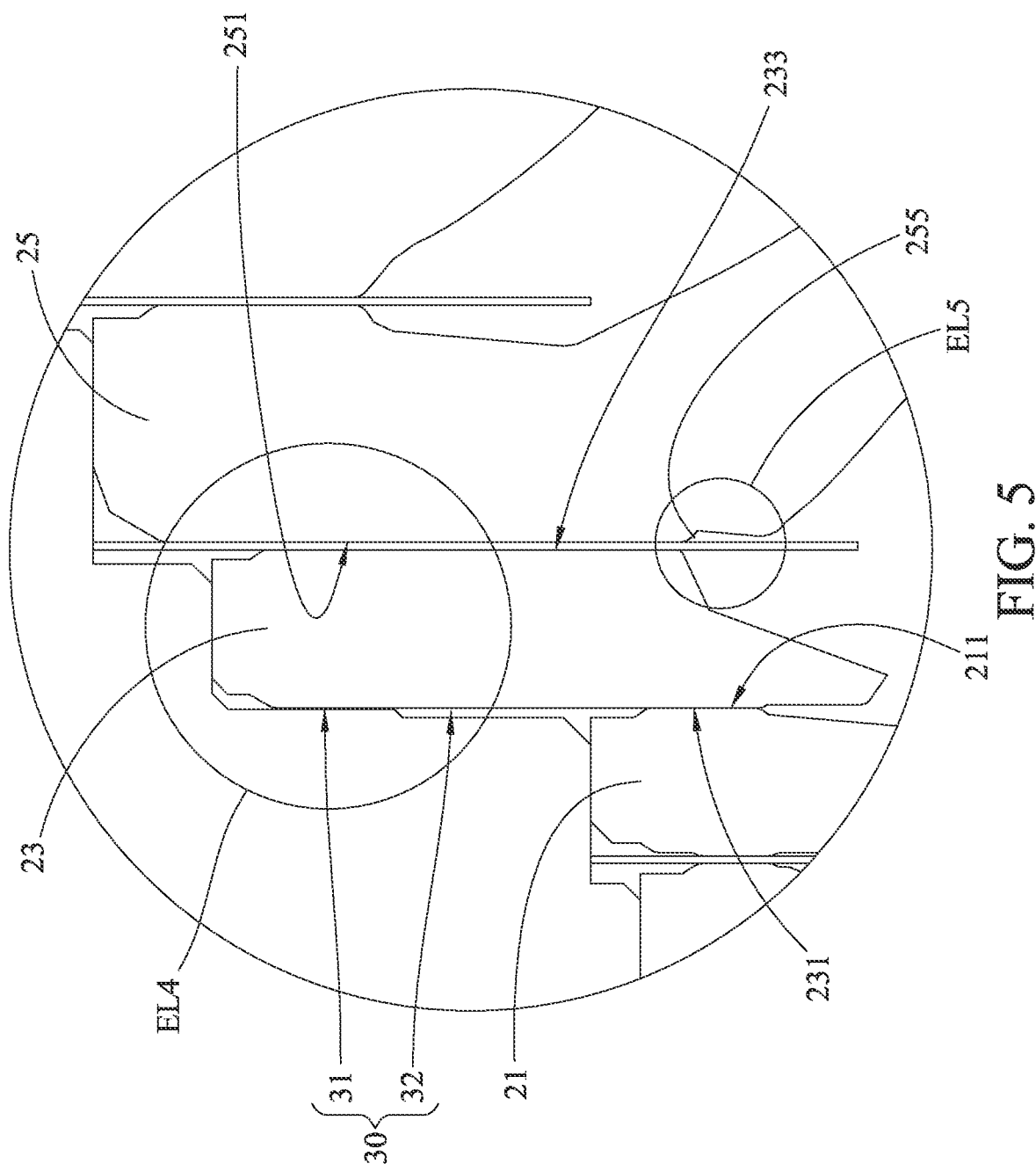
FIG. 5 is an enlarged view of region EL3 in FIG. 1.
Figure 6:
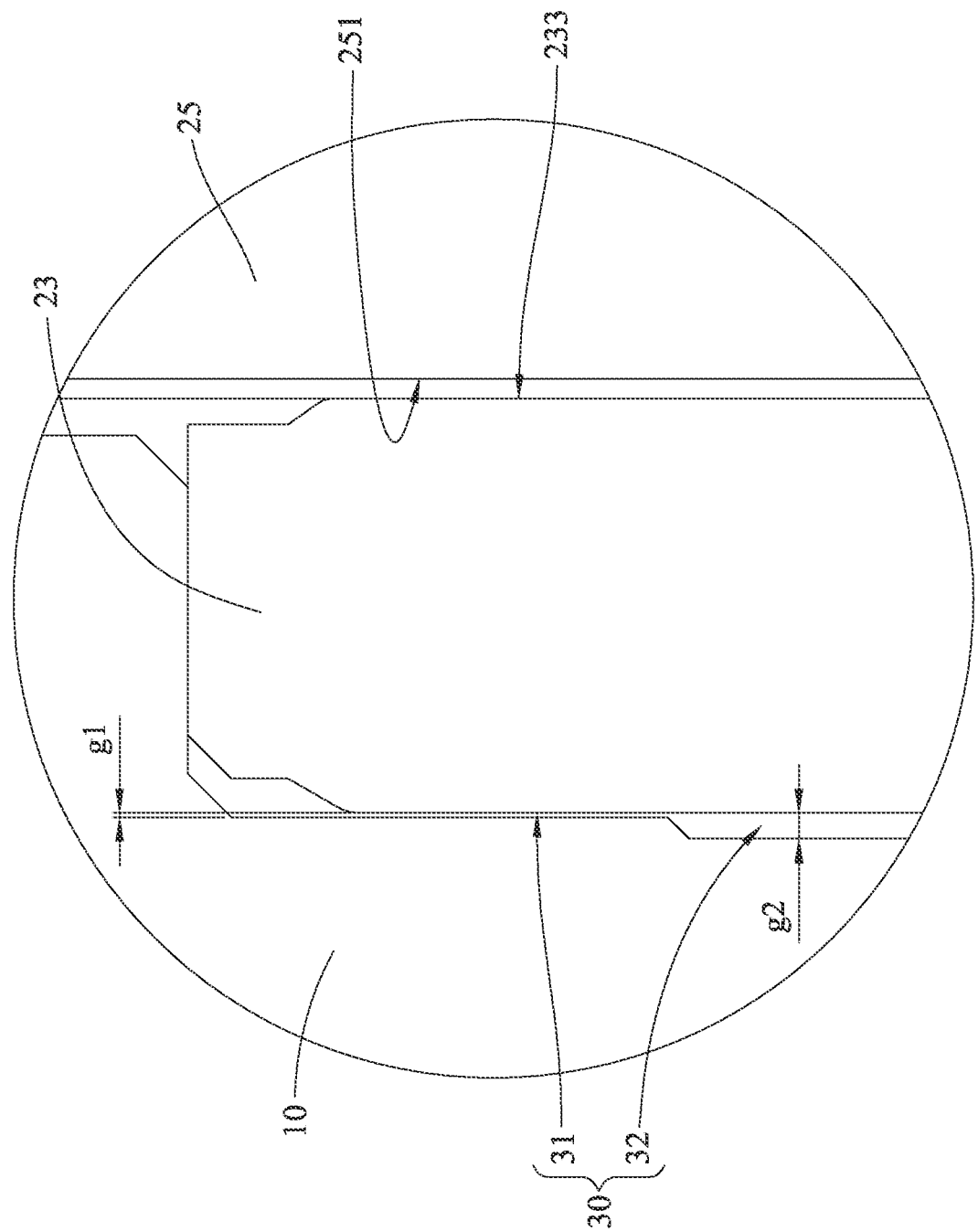
FIG. 6 is an enlarged view of region EL4 in FIG. 5.
Figure 7:
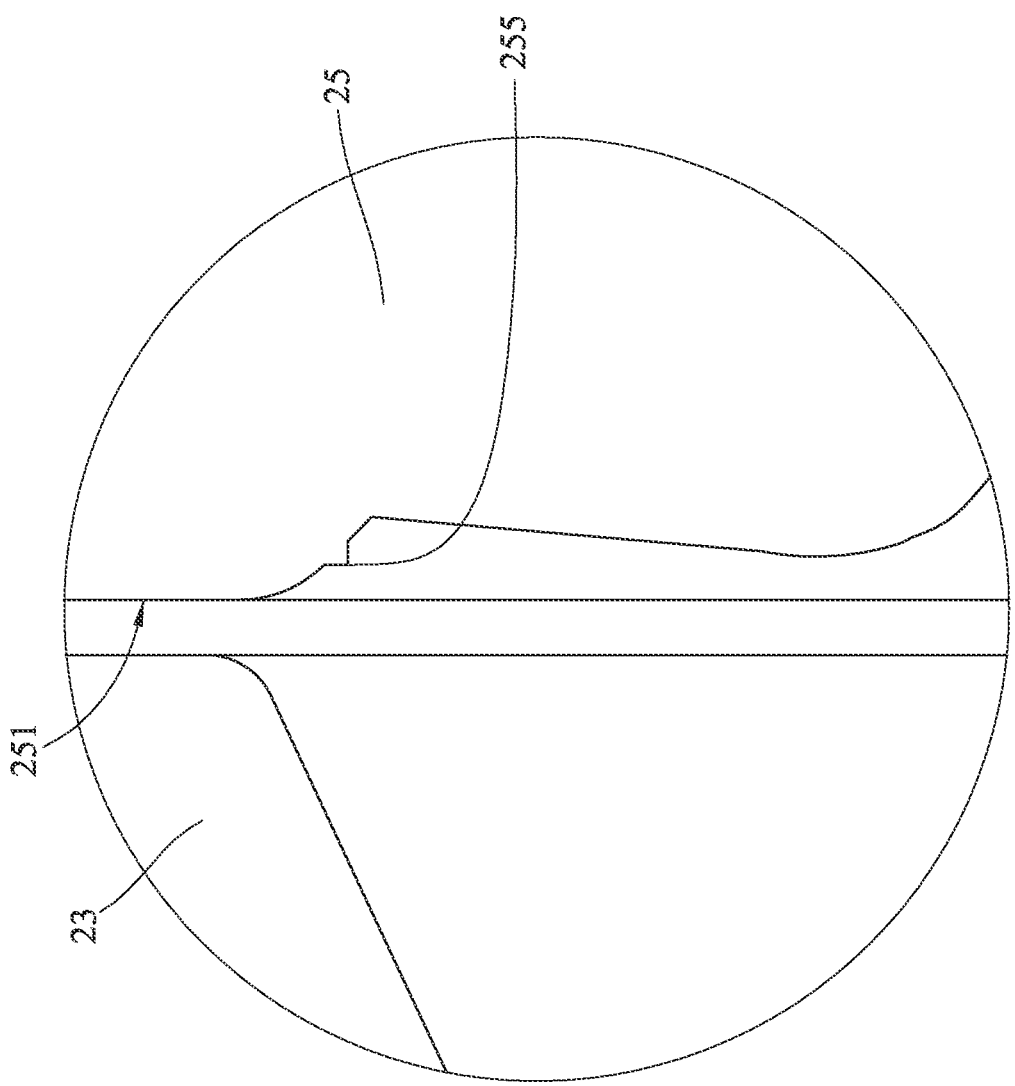
FIG. 7 is an enlarged view of region EL5 in FIG. 5.

Please refer to FIG. 1 to FIG. 7. FIG. 1 is a sectional perspective view of an imaging lens system according to the 1st embodiment of the present disclosure, FIG. 2 is an enlarged view of region EL1 in FIG. 1, FIG. 3 is an enlarged view of region EL2 in FIG. 2, FIG. 4 is a cross-sectional view of the imaging lens system in FIG. 1, FIG. 5 is an enlarged view of region EL3 in FIG. 1, FIG. 6 is an enlarged view of region EL4 in FIG. 5, and FIG. 7 is an enlarged view of region EL5 in FIG. 5.

The imaging lens system 1 includes a lens barrel element 10 and an imaging lens assembly 20. The imaging lens assembly 20 is disposed on the lens barrel element 10. The imaging lens assembly 20 includes, in order from an object side to an image side, a first imaging lens element 21, a spacer element 23 and a second imaging lens element 25.

The first imaging lens element 21 has a first image-side contact surface 211. The spacer element 23 has a second object-side contact surface 231 and a second image-side contact surface 233. The second object-side contact surface 231 of the spacer element 23 corresponds to the first image-side contact surface 211 of the first imaging lens element 21. The second imaging lens element 25 has a third object-side contact surface 251 corresponding to the second image-side contact surface 233 of the spacer element 23.

The lens barrel element 10 and the spacer element 23 together form a buffer structure 30, and the buffer structure 30 is located farther away form an optical axis OL of the imaging lens system 1 than the first image-side contact surface 211 of the first imaging lens element 21 to the optical axis OL. The buffer structure 30 includes a first gap 31 and a second gap 32. The first gap 31 at least partially overlaps the third object-side contact surface 251 of the second imaging lens element 25 in a direction parallel to the optical axis OL. There is a step difference between the first gap 31 and the second gap 32. The second gap 32 is located closer to the optical axis OL than the first gap 31 to the optical axis OL.

The spacer element 23 is a plastic spacer element which can be one-piece formed by injection molding process and can have at least one gate trace. In addition, the plastic spacer element can, for example, include a liquid-crystal polymer or a glass fiber.

The second imaging lens element 25 includes a mark structure 255, and the mark structure 255 can be a demolded structure formed on the second imaging lens element 25 after the second imaging lens element 25 is removed from a shaping mold for manufacturing the second imaging lens element 25. The mark structure 255 is an annular tapering protrusion surrounding the optical axis OL, and the mark structure 255 is located closer to the optical axis OL than the third object-side contact surface 251 of the second imaging lens element 25 to the optical axis OL.

When a width of the first gap 31 is g1, and a width of the second gap 32 is g2, the following conditions are satisfied: g1=0.005 millimeters (mm); g2=0.03 mm; and g1/g2=0.167.

When an inner diameter of the first gap 31 is $\Phi g1$, an outer diameter of the first image-side contact surface 211 is $\Phi o1$, and an outer diameter of the second image-side contact surface 233 is $\Phi o2$, the following conditions are satisfied: $\Phi g1$=8.89 mm; $\Phi o1$=7.321 mm; $\Phi o2$=9.66 mm; and ($\Phi g1-\Phi o1$)/($\Phi o2-\Phi o1$)=0.671.

When the width of the first gap 31 is g1, the following condition is satisfied: g1=5 μm.

When the outer diameter of the first image-side contact surface 211 is $\Phi o1$, and the outer diameter of the second image-side contact surface 233 is $\Phi o2$, the following conditions are satisfied: $\Phi o1$=7.321 mm; $\Phi o2$=9.66 mm; and $\Phi o1/\Phi o2$=0.758.

When the width of the first gap 31 is g1, an inner diameter of the first image-side contact surface 211 is $\Phi i1$, and the inner diameter of the first gap 31 is $\Phi g1$, the following conditions are satisfied: g1=0.005 mm; $\Phi g1$=8.89 mm; $\Phi i1$=6.712 mm; and 1000×g1/($\Phi g1-\Phi i1$)=2.3.

2nd Embodiment

Figure 8:
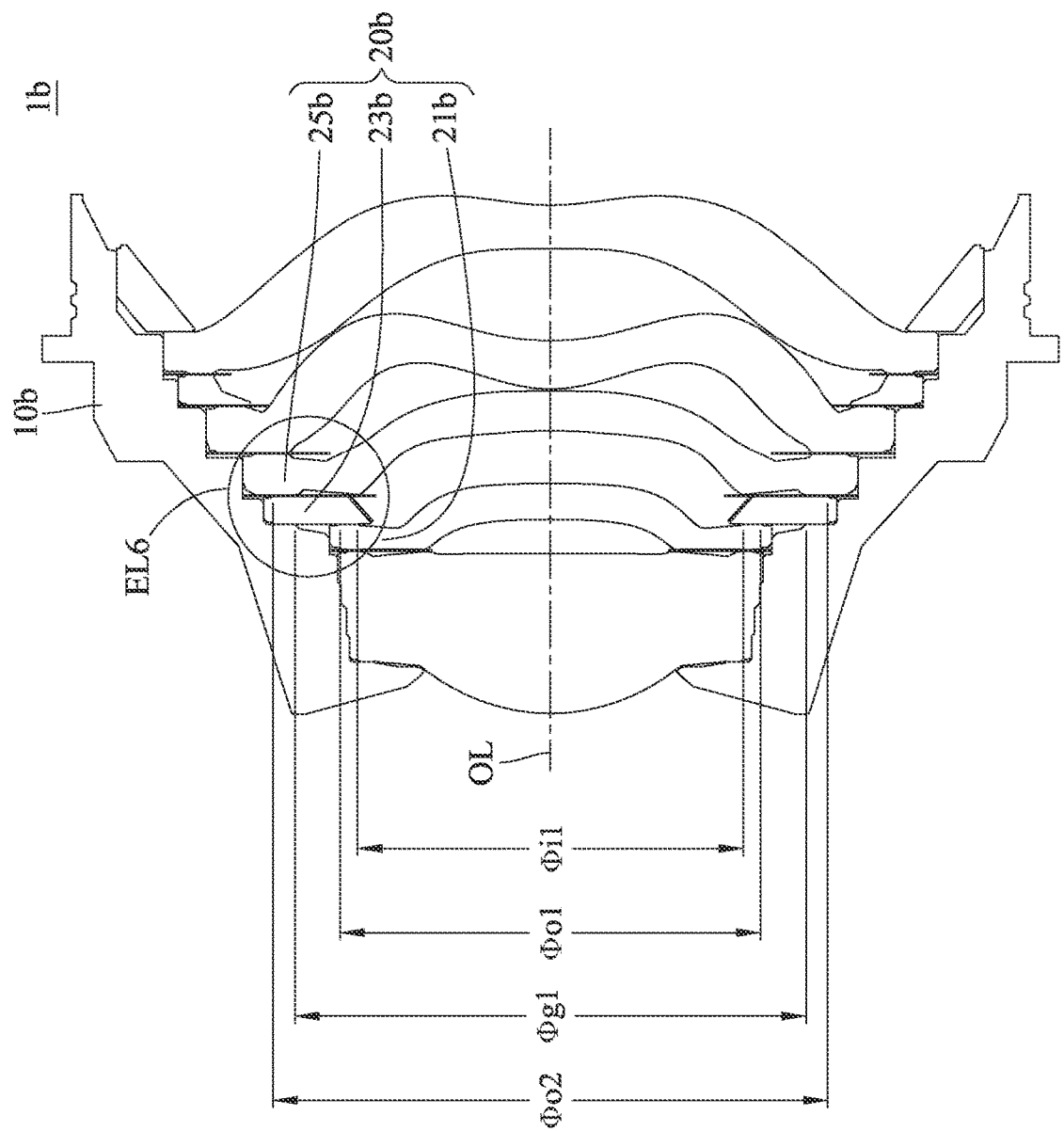
FIG. 8 is a cross-sectional view of an imaging lens system according to the 2nd embodiment of the present disclosure.
Figure 9:
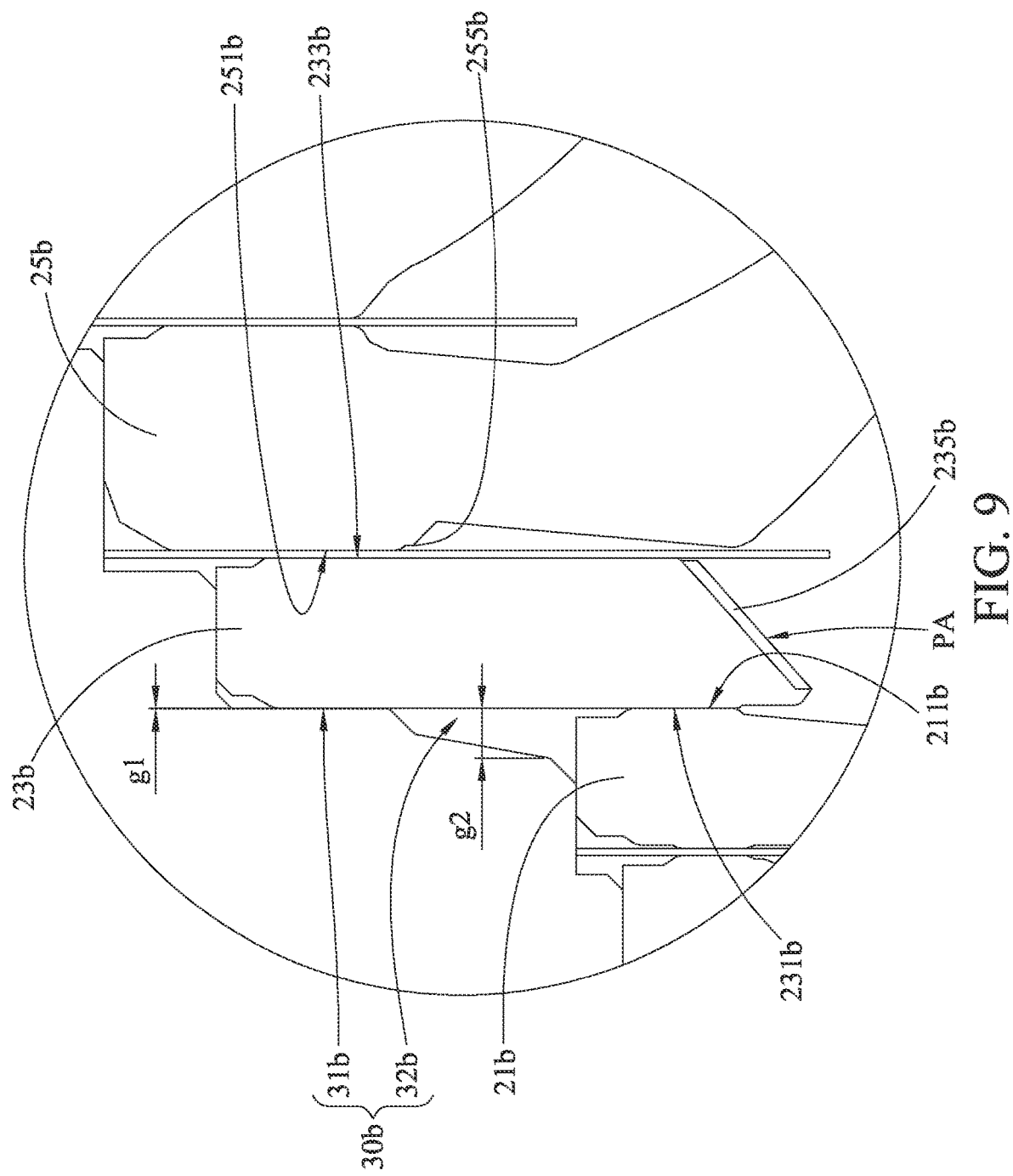
FIG. 9 is an enlarged view of region EL6 in FIG. 8.
Figure 10:
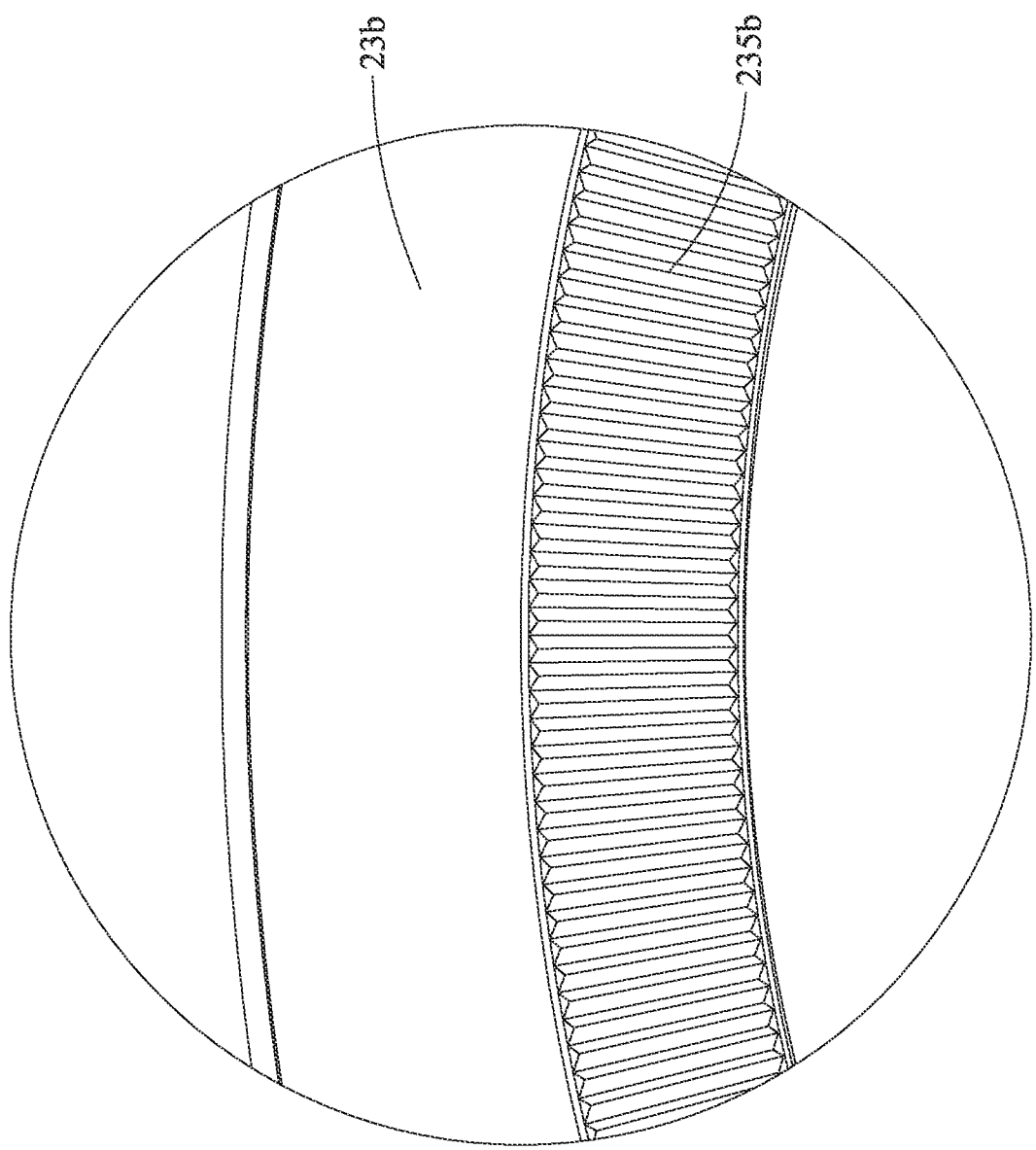
FIG. 10 is a partial exploded view of a spacer element and strip groove structures thereof in a region pointed by arrow PA in FIG. 8.

Please refer to FIG. 8 to FIG. 10. FIG. 8 is a cross-sectional view of an imaging lens system according to the 2nd embodiment of the present disclosure, FIG. 9 is an enlarged view of region EL6 in FIG. 8, and FIG. 10 is a partial exploded view of a spacer element and strip groove structures thereof in a region pointed by arrow PA in FIG. 8.

The imaging lens system 1b includes a lens barrel element 10b and an imaging lens assembly 20b. The imaging lens assembly 20b is disposed on the lens barrel element 10b. The imaging lens assembly 20b includes, in order from an object side to an image side, a first imaging lens element 21b, a spacer element 23b and a second imaging lens element 25b.

The first imaging lens element 21b has a first image-side contact surface 211b. The spacer element 23b has a second object-side contact surface 231b and a second image-side contact surface 233b. The second object-side contact surface 231b of the spacer element 23b corresponds to the first image-side contact surface 211b of the first imaging lens element 21b. The second imaging lens element 25b has a third object-side contact surface 251b corresponding to the second image-side contact surface 233b of the spacer element 23b.

The lens barrel element 10b and the spacer element 23b together form a buffer structure 30b, and the buffer structure 30b is located farther away from an optical axis OL of the imaging lens system 1b than the first image-side contact surface 211b of the first imaging lens element 21b to the optical axis OL. The buffer structure 30b includes a first gap 31b and a second gap 32b. The first gap 31b at least partially overlaps the third object-side contact surface 251b of the second imaging lens element 25b in a direction parallel to the optical axis OL. There is a step difference between the first gap 31b and the second gap 32b. The second gap 32b is located closer to the optical axis OL than the first gap 31b to the optical axis OL.

The spacer element 23b is a plastic spacer element which can be one-piece formed by injection molding process and can have at least one gate trace. In addition, the plastic spacer element can, for example, include a liquid-crystal polymer or a glass fiber. In this embodiment, the spacer element 23b has a plurality of strip groove structures 235b extending from the second object-side contact surface 231b to the second image-side contact surface 233b, and the strip groove structures 235b are regularly arranged around the optical axis OL.

The second imaging lens element 25b includes a mark structure 255b, and the mark structure 255b can be a demolded structure formed on the second imaging lens element 25b after the second imaging lens element 25b is removed from a shaping mold for manufacturing the second imaging lens element 25b. The mark structure 255b is an annular tapering protrusion surrounding the optical axis OL, and the mark structure 255b is located closer to the optical axis OL than the third object-side contact surface 251b of the second imaging lens element 25b to the optical axis OL.

When a width of the first gap 31b is g1, and a width of the second gap 32b is g2, the following conditions are satisfied: g1=0.003 mm; g2=0.162 mm; and g1/g2=0.019. In this embodiment, the second gap 32b is uneven in width.

When an inner diameter of the first gap 31b is $\Phi g1$, an outer diameter of the first image-side contact surface 211b is $\Phi o1$, and an outer diameter of the second image-side contact surface 233b is $\Phi o2$, the following conditions are satisfied: $\Phi g1$=8.894 mm; $\Phi o1$=7.321 mm; $\Phi o2$=9.66 mm; and ($\Phi g1-\Phi o1$)/($\Phi o2-\Phi o1$)=0.673.

When the width of the first gap 31b is g1, the following condition is satisfied: g1=3 μm.

When the outer diameter of the first image-side contact surface 211b is $\Phi o1$, and the outer diameter of the second image-side contact surface 233b is $\Phi o2$, the following conditions are satisfied: $\Phi o1$=7.321 mm; $\Phi o2$=9.66 mm; and $\Phi o1/\Phi o2$=0.758.

When the width of the first gap 31b is g1, an inner diameter of the first image-side contact surface 211b is $\Phi i1$, and the inner diameter of the first gap 31b is $\Phi g1$, the following conditions are satisfied: g1=0.003 mm; $\Phi g1$=8.894 mm; $\Phi i1$=6.712 mm; and 1000×g1/($\Phi g1-\Phi i1$)=1.4.

3rd Embodiment

Figure 11:
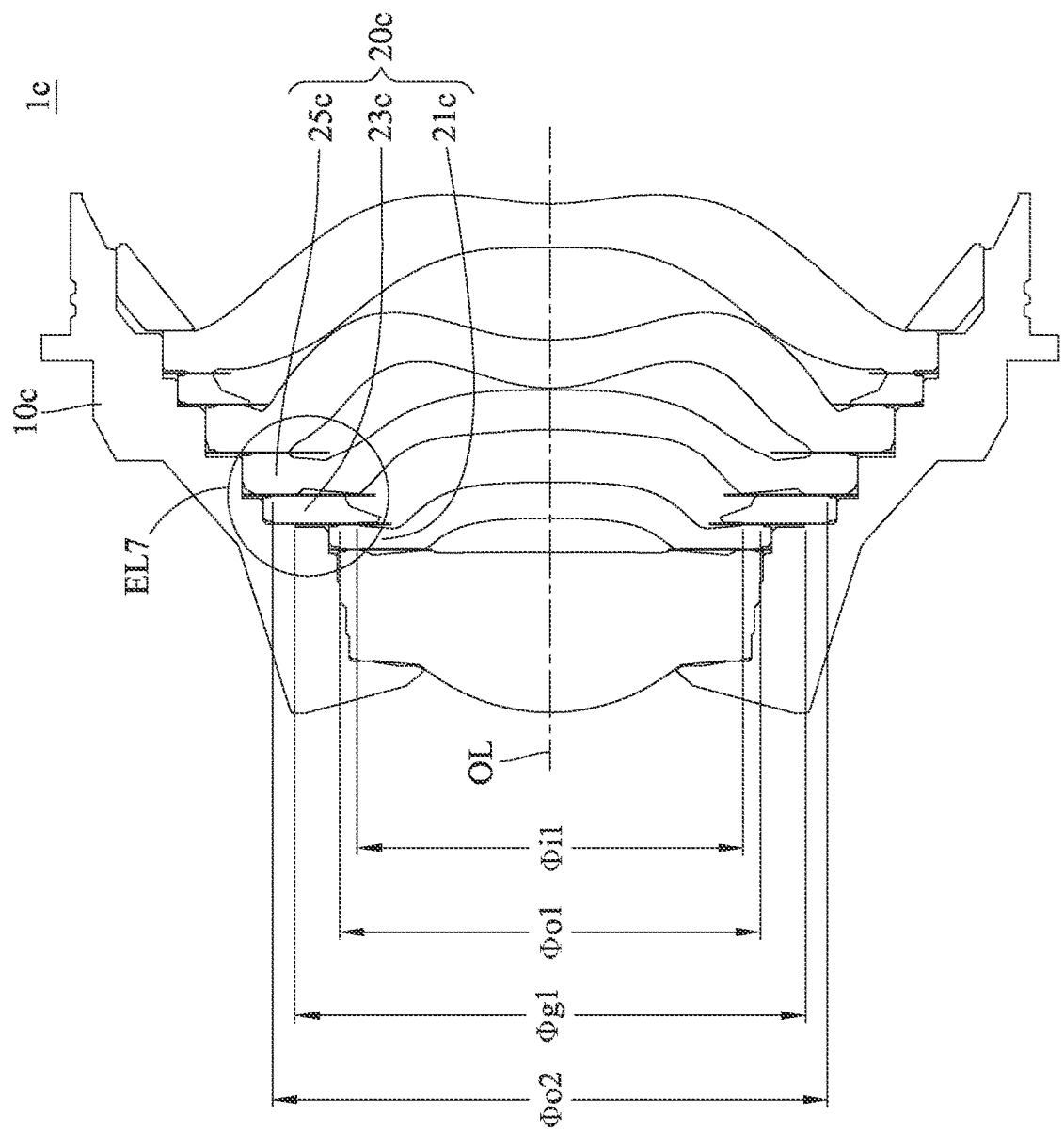
FIG. 11 is a cross-sectional view of an imaging lens system according to the 3rd embodiment of the present disclosure.
Figure 12:
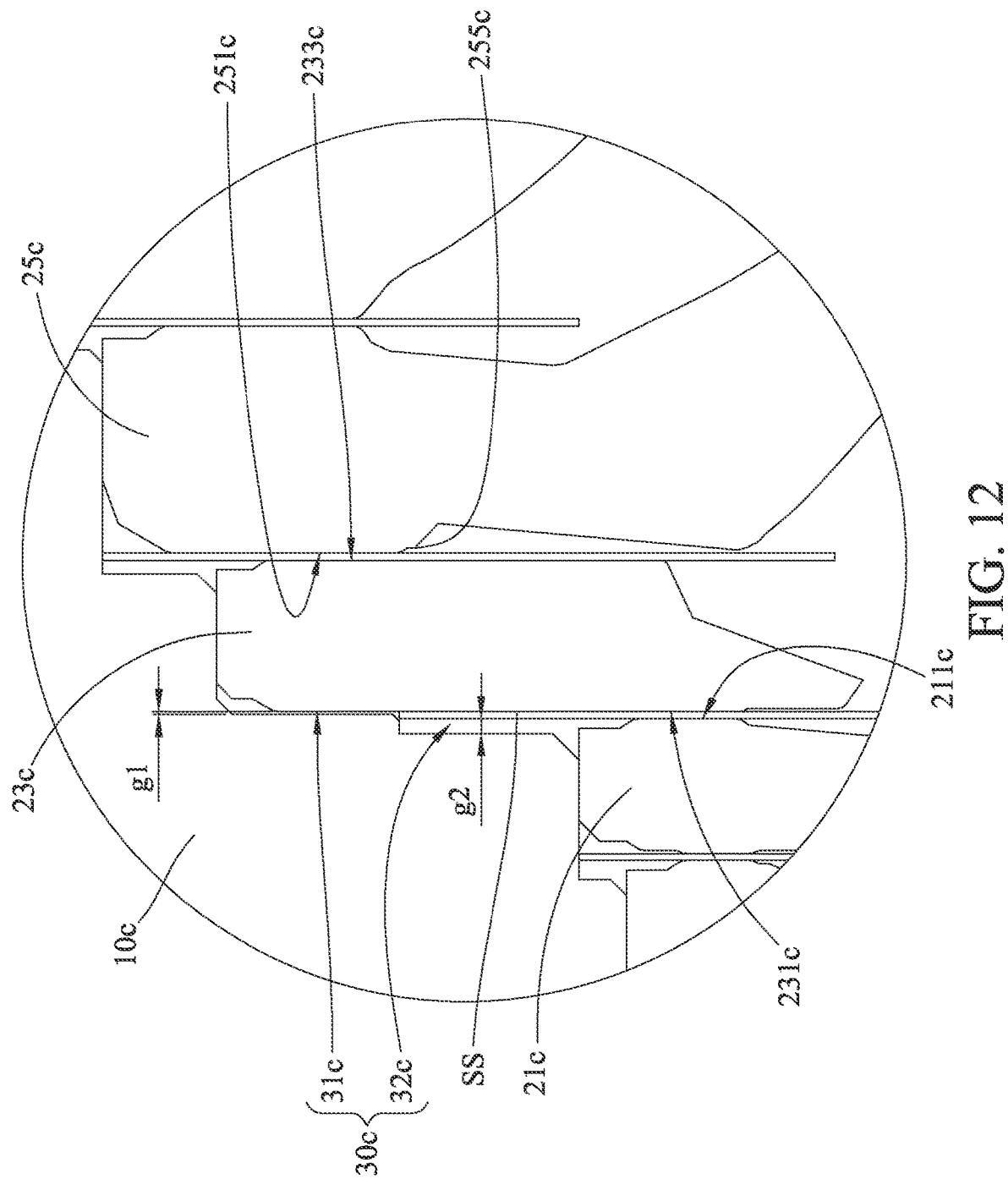
FIG. 12 is an enlarged view of region EL7 in FIG. 11.

Please refer to FIG. 11 and FIG. 12. FIG. 11 is a cross-sectional view of an imaging lens system according to the 3rd embodiment of the present disclosure, and FIG. 12 is an enlarged view of region EL7 in FIG. 11.

The imaging lens system 1c includes a lens barrel element 10c and an imaging lens assembly 20c. The imaging lens assembly 20c is disposed on the lens barrel element 10c. The imaging lens assembly 20c includes, in order from an object side to an image side, a first imaging lens element 21c, a spacer element 23c and a second imaging lens element 25c.

The first imaging lens element 21c has a first image-side contact surface 211c. The spacer element 23c has a second object-side contact surface 231c and a second image-side contact surface 233c. The second object-side contact surface 231c of the spacer element 23c corresponds to the first image-side contact surface 211c of the first imaging lens element 21c. The second imaging lens element 25c has a third object-side contact surface 251c corresponding to the second image-side contact surface 233c of the spacer element 23c.

The lens barrel element 10c and the spacer element 23c together form a buffer structure 30c, and the buffer structure 30c is located farther away from an optical axis OL of the imaging lens system 1c than the first image-side contact surface 211c of the first imaging lens element 21c to the optical axis OL. The buffer structure 30c includes a first gap 31c and a second gap 32c. The first gap 31c at least partially overlaps the third object-side contact surface 251c of the second imaging lens element 25c in a direction parallel to the optical axis OL. There is a step difference between the first gap 31c and the second gap 32c. The second gap 32c is located closer to the optical axis OL than the first gap 31c to the optical axis OL.

The spacer element 23c is a plastic spacer element which can be one-piece formed by injection molding process and can have at least one gate trace. In addition, the plastic spacer element can, for example, include a liquid-crystal polymer or a glass fiber. In this embodiment, the second object-side contact surface 231c of the spacer element 23c is provided with a light blocking sheet SS.

The second imaging lens element 25c includes a mark structure 255c, and the mark structure 255c can be a demolded structure formed on the second imaging lens element 25c after the second imaging lens element 25c is removed from a shaping mold for manufacturing the second imaging lens element 25c. The mark structure 255c is an annular tapering protrusion surrounding the optical axis OL, and the mark structure 255c is located closer to the optical axis OL than the third object-side contact surface 251c of the second imaging lens element 25c to the optical axis OL.

When a width of the first gap 31c is g1, and a width of the second gap 32c is g2, the following conditions are satisfied: g1=0.01 mm; g2=0.047 mm; and g1/g2=0.213.

When an inner diameter of the first gap 31c is $\Phi g1$, an outer diameter of the first image-side contact surface 211c is $\Phi o1$, and an outer diameter of the second image-side contact surface 233c is $\Phi o2$, the following conditions are satisfied: $\Phi g1$=8.88 mm; $\Phi o1$=7.321 mm; $\Phi o2$=9.66 mm; and ($\Phi g1-\Phi o1$)/($\Phi o2-\Phi o1$)=0.667.

When the width of the first gap 31c is g1, the following condition is satisfied: g1=10 μm.

When the outer diameter of the first image-side contact surface 211c is $\Phi o1$, and the outer diameter of the second image-side contact surface 233c is $\Phi o2$, the following conditions are satisfied: $\Phi o1$=7.321 mm; $\Phi o2$=9.66 mm; and $\Phi o1/\Phi o2$=0.758.

When the width of the first gap 31c is g1, the inner diameter of the first image-side contact surface 211c is $\Phi i1$, and the inner diameter of the first gap 31c is $\Phi g1$, the following conditions are satisfied: g1=0.01 mm; $\Phi g1$=8.88 mm; $\Phi i1$=6.712 mm; and 1000×g1/($\Phi g1-\Phi i1$)=4.6.

4th Embodiment

Figure 13:
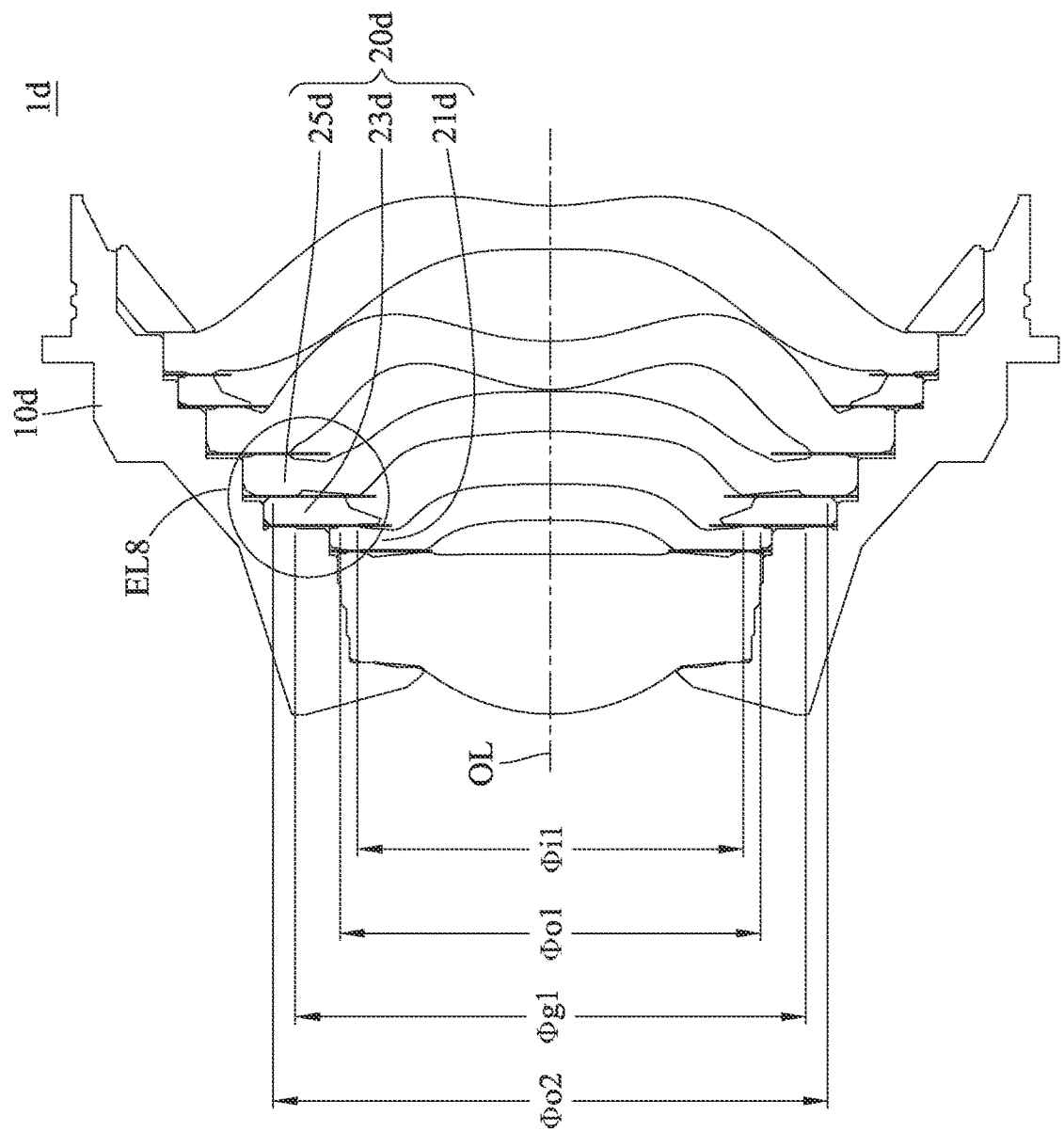
FIG. 13 is a cross-sectional view of an imaging lens system according to the 4th embodiment of the present disclosure.
Figure 14:
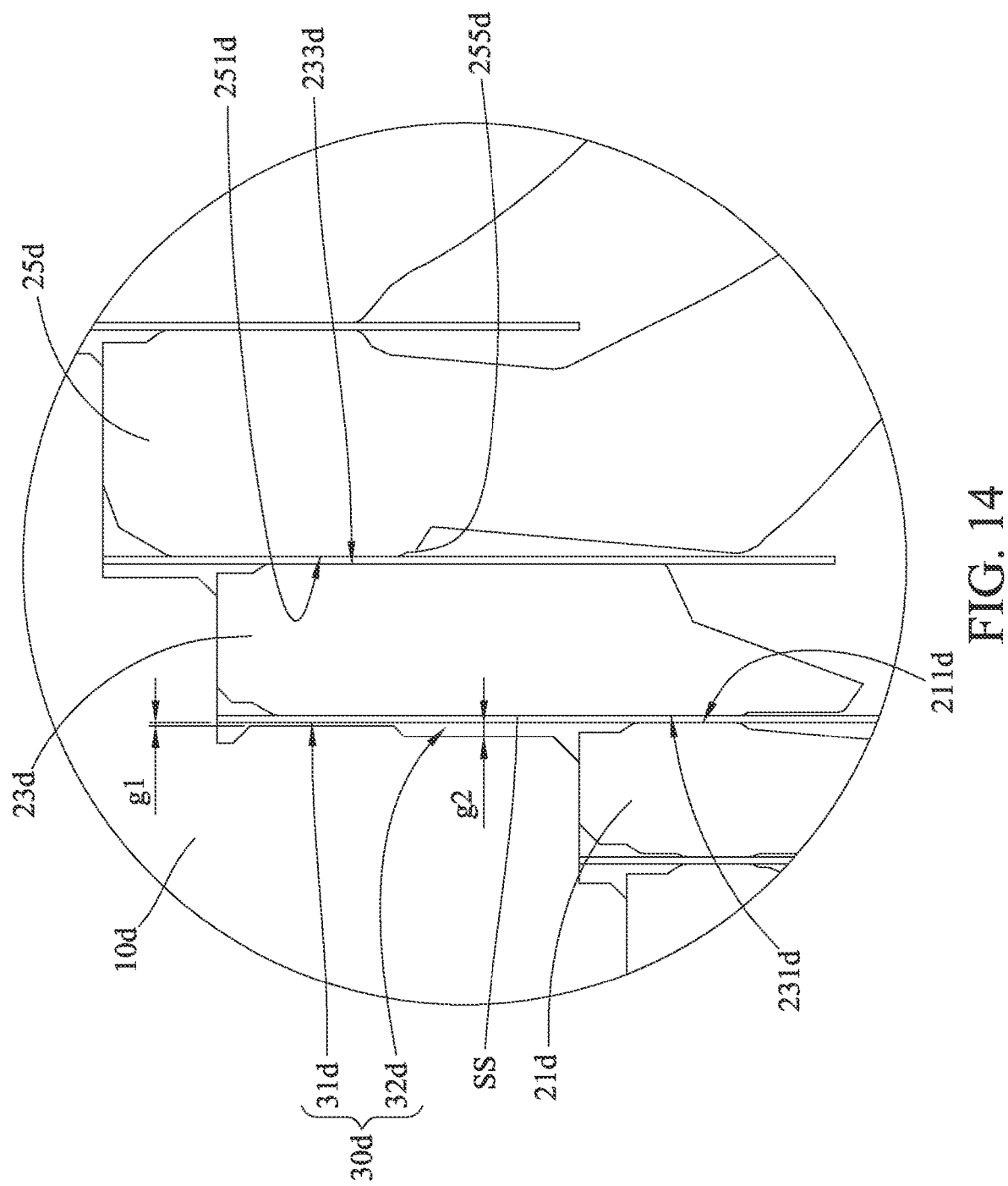
FIG. 14 is an enlarged view of region EL8 in FIG. 13.

Please refer to FIG. 13 and FIG. 14. FIG. 13 is a cross-sectional view of an imaging lens system according to the 4th embodiment of the present disclosure, and FIG. 14 is an enlarged view of region EL8 in FIG. 13.

The imaging lens system 1d includes a lens barrel element 10d and an imaging lens assembly 20d. The imaging lens assembly 20d is disposed on the lens barrel element 10d. The imaging lens assembly 20d includes, in order from an object side to an image side, a first imaging lens element 21d, a spacer element 23d and a second imaging lens element 25d.

The first imaging lens element 21d has a first image-side contact surface 211d. The spacer element 23d has a second object-side contact surface 231d and a second image-side contact surface 233d. The second object-side contact surface 231d of the spacer element 23d corresponds to the first image-side contact surface 211d of the first imaging lens element 21d. The second imaging lens element 25d has a third object-side contact surface 251d corresponding to the second image-side contact surface 233d of the spacer element 23d.

The lens barrel element 10d and the spacer element 23d together form a buffer structure 30d, and the buffer structure 30d is located farther away from an optical axis OL of the imaging lens system 1d than the first image-side contact surface 211d of the first imaging lens element 21d to the optical axis OL. The buffer structure 30d includes a first gap 31d and a second gap 32d. The first gap 31d at least partially overlaps the third object-side contact surface 251d of the second imaging lens element 25d in a direction parallel to the optical axis OL. There is a step difference between the first gap 31d and the second gap 32d. The second gap 32d is located closer to the optical axis OL than the first gap 31d to the optical axis OL.

In this embodiment, the spacer element 23d is a metal spacer element. In addition, the second object-side contact surface 231d of the spacer element 23d is provided with a light blocking sheet SS.

The second imaging lens element 25d includes a mark structure 255d, and the mark structure 255d can be a demolded structure formed on the second imaging lens element 25d after the second imaging lens element 25d is removed from a shaping mold for manufacturing the second imaging lens element 25d. The mark structure 255d is an annular tapering protrusion surrounding the optical axis OL, and the mark structure 255d is located closer to the optical axis OL than the third object-side contact surface 251d of the second imaging lens element 25d to the optical axis OL.

When a width of the first gap 31d is g1, and a width of the second gap 32d is g2, the following conditions are satisfied: g1=0.01 mm; g2=0.045 mm; and g1/g2=0.222.

When an inner diameter of the first gap 31d is $\Phi g1$, an outer diameter of the first image-side contact surface 211d is $\Phi o1$, and an outer diameter of the second image-side contact surface 233d is $\Phi o2$, the following condition is satisfied: $\Phi g1$=8.88 mm; $\Phi o1$=7.321 mm; $\Phi o2$=9.66 mm; and ($\Phi g1-\Phi o1$)/($\Phi o2-\Phi o1$)=0.667.

When the width of the first gap 31d is g1, the following condition is satisfied: g1=10 μm.

When the outer diameter of the first image-side contact surface 211d is $\Phi o1$, and the outer diameter of the second image-side contact surface 233d is $\Phi o2$, the following conditions are satisfied: $\Phi o1$=7.321 mm; $\Phi o2$=9.66 mm; and $\Phi o1/\Phi o2$=0.758.

When the width of the first gap 31d is g1, an inner diameter of the first image-side contact surface 211d is $\Phi i1$, and the inner diameter of the first gap 31d is $\Phi g1$, the following conditions are satisfied: g1=0.01 mm; Φg1=8.88 mm; Φi1=6.712 mm; and 1000×g1/(Φg1−Φi1)=4.6.

5th Embodiment

Figure 15:
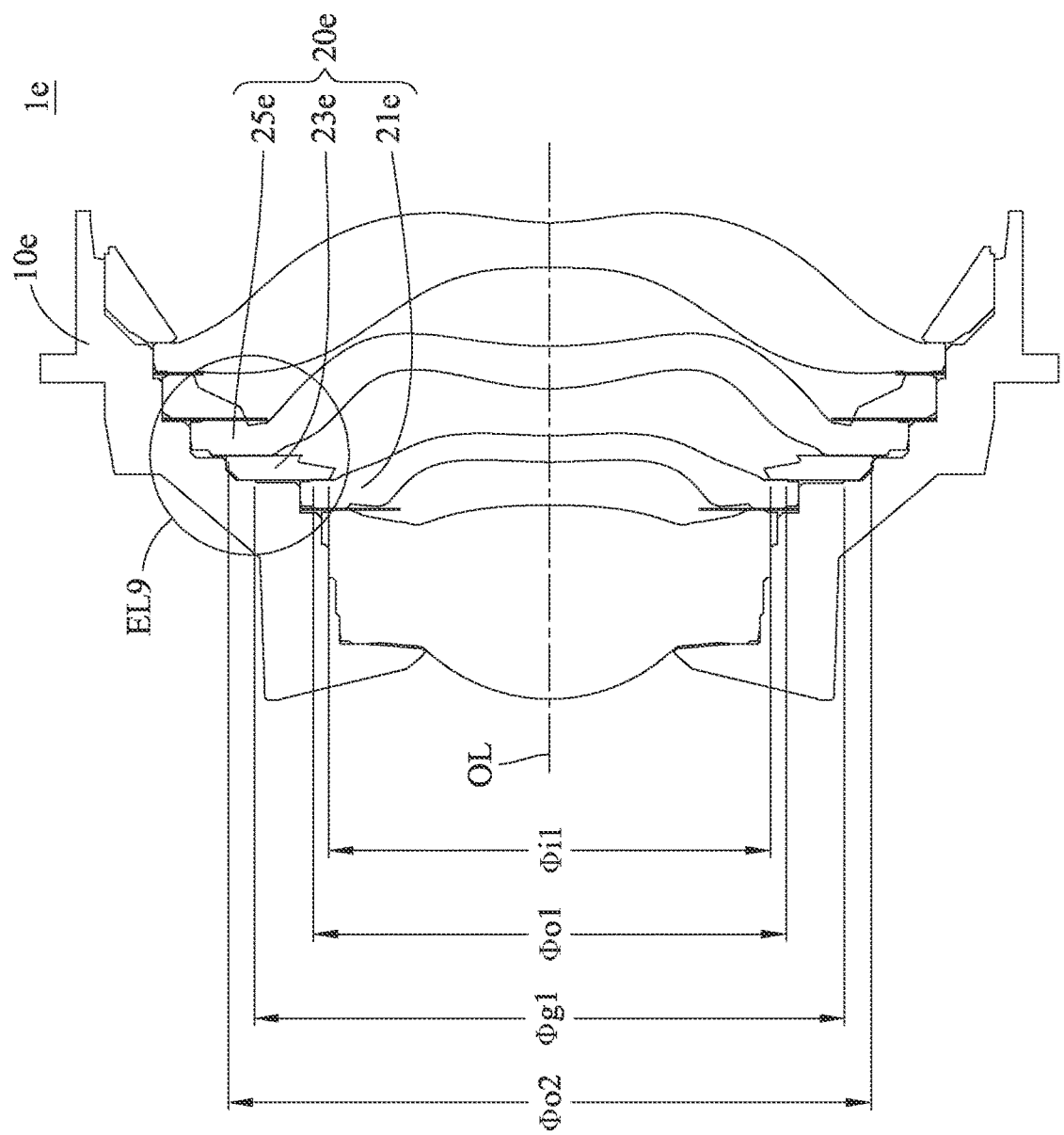
FIG. 15 is a cross-sectional view of an imaging lens system according to the 5th embodiment of the present disclosure.
Figure 16:
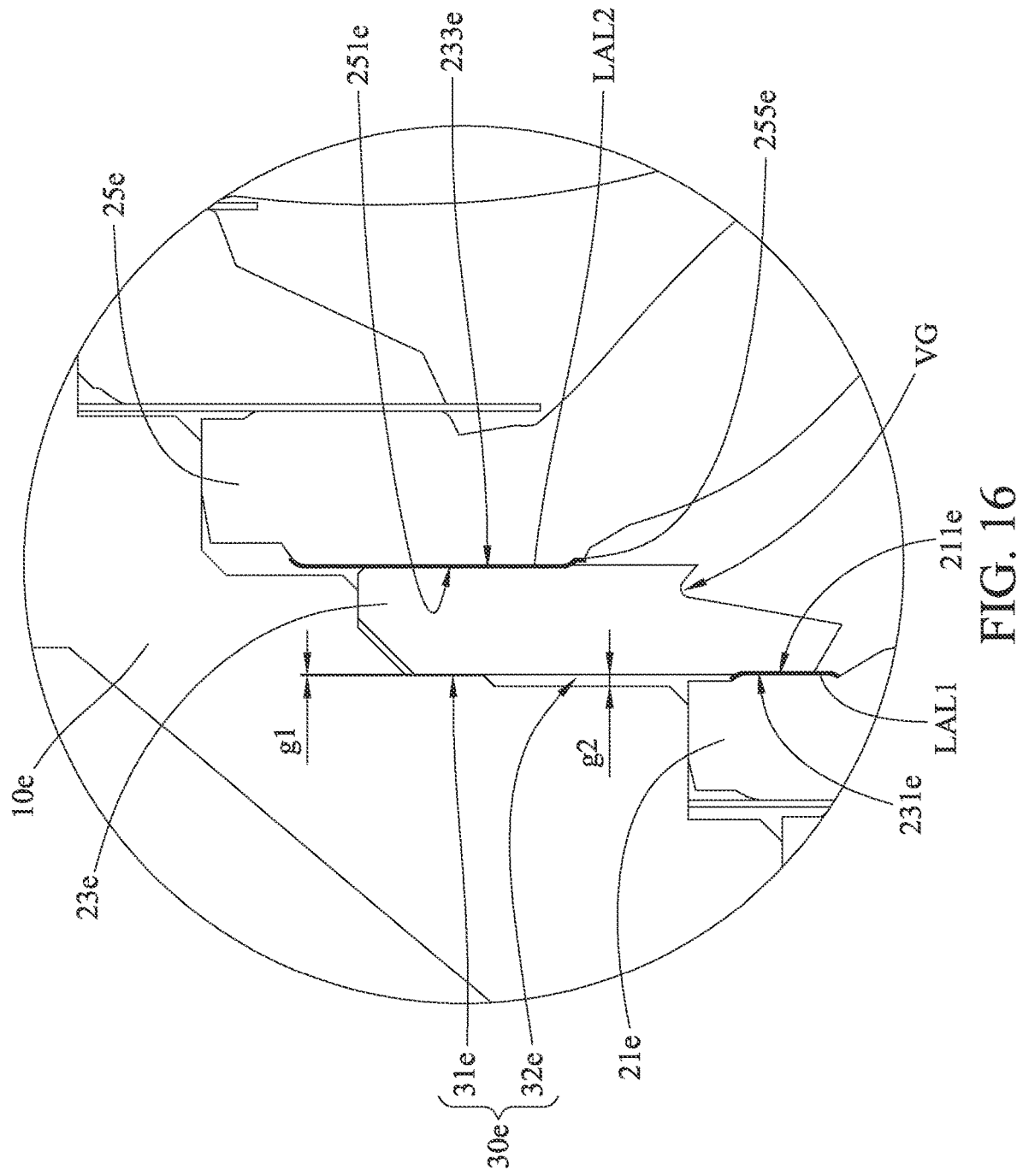
FIG. 16 is an enlarged view of region EL9 in FIG. 15.

Please refer to FIG. 15 and FIG. 16. FIG. 15 is a cross-sectional view of an imaging lens system according to the 5th embodiment of the present disclosure, and FIG. 16 is an enlarged view of region EL9 in FIG. 15.

The imaging lens system 1e includes a lens barrel element 10e and an imaging lens assembly 20e. The imaging lens assembly 20e is disposed on the lens barrel element 10e. The imaging lens assembly 20e includes, in order from an object side to an image side, a first imaging lens element 21e, a spacer element 23e and a second imaging lens element 25e.

The first imaging lens element 21e has a first image-side contact surface 211e. The spacer element 23e has a second object-side contact surface 231e and a second image-side contact surface 233e. The second object-side contact surface 231e of the spacer element 23e corresponds to the first image-side contact surface 211e of the first imaging lens element 21e. The second imaging lens element 25e has a third object-side contact surface 251e corresponding to the second image-side contact surface 233e of the spacer element 23e.

The lens barrel element 10e and the spacer element 23e together form a buffer structure 30e, and the buffer structure 30e is located farther away from an optical axis OL of the imaging lens system 1e than the first image-side contact surface 211e of the first imaging lens element 21e to the optical axis OL. The buffer structure 30e includes a first gap 31e and a second gap 32e. The first gap 31e at least partially overlaps the third object-side contact surface 251e of the second imaging lens element 25e in a direction parallel to the optical axis OL. There is a step difference between the first gap 31e and the second gap 32e. The second gap 32e is located closer to the optical axis OL than the first gap 31e to the optical axis OL.

In this embodiment, the spacer element 23e is a metal spacer element, and the spacer element 23e has a V-shaped groove VG recessed in a direction away from the optical axis OL.

The second imaging lens element 25e includes a mark structure 255e, and the mark structure 255e can be a demolded structure formed on the second imaging lens element 25e after the second imaging lens element 25e is removed from a shaping mold for manufacturing the second imaging lens element 25e. The mark structure 255e is an annular tapering protrusion surrounding the optical axis OL, and the mark structure 255e is located closer to the optical axis OL than the third object-side contact surface 251e of the second imaging lens element 25e to the optical axis OL.

In this embodiment, the first image-side contact surface 211e of the first imaging lens element 21e is provided with a light absorption coating layer LAL1, and the light absorption coating layer LAL1 is in physical contact with the spacer element 23e. In addition, the third object-side contact surface 251e of the second imaging lens element 25e is provided with a light absorption coating layer LAL2, and the light absorption coating layer LAL2 is in physical with the spacer element 23e.

When a width of the first gap 31e is g1, and a width of the second gap 32e is g2, the following conditions are satisfied: g1=0.003 mm; g2=0.036 mm; and g1/g2=0.083.

When an inner diameter of the first gap 31e is Φg1, an outer diameter of the first image-side contact surface 211e is Φo1, and an outer diameter of the second image-side contact surface 233e is Φo2, the following conditions are satisfied: Φg1=8.3 mm; Φo1=6.636 mm; Φo2=9.04 mm; and (Φg1−Φo1)/(Φo2−Φo1)=0.692.

When the width of the first gap 31e is g1, the following condition is satisfied: g1=3 µm.

When the outer diameter of the first image-side contact surface 211e is Φo1, and the outer diameter of the second image-side contact surface 233e is Φo2, the following conditions are satisfied: Φo1=6.636 mm; Φo2=9.04 mm; and Φo1/Φo2=0.734.

When the width of the first gap 31e is g1, and an inner diameter of the first image-side contact surface 211e is Φi1, and the inner diameter of the first gap 31e is Φg1, the following conditions are satisfied: g1=0.003 mm; Φg1=8.3 mm; Φi1=6.205 mm; and 1000×g1/(Φg1−Φi1)=1.4.

6th Embodiment

Figure 17:
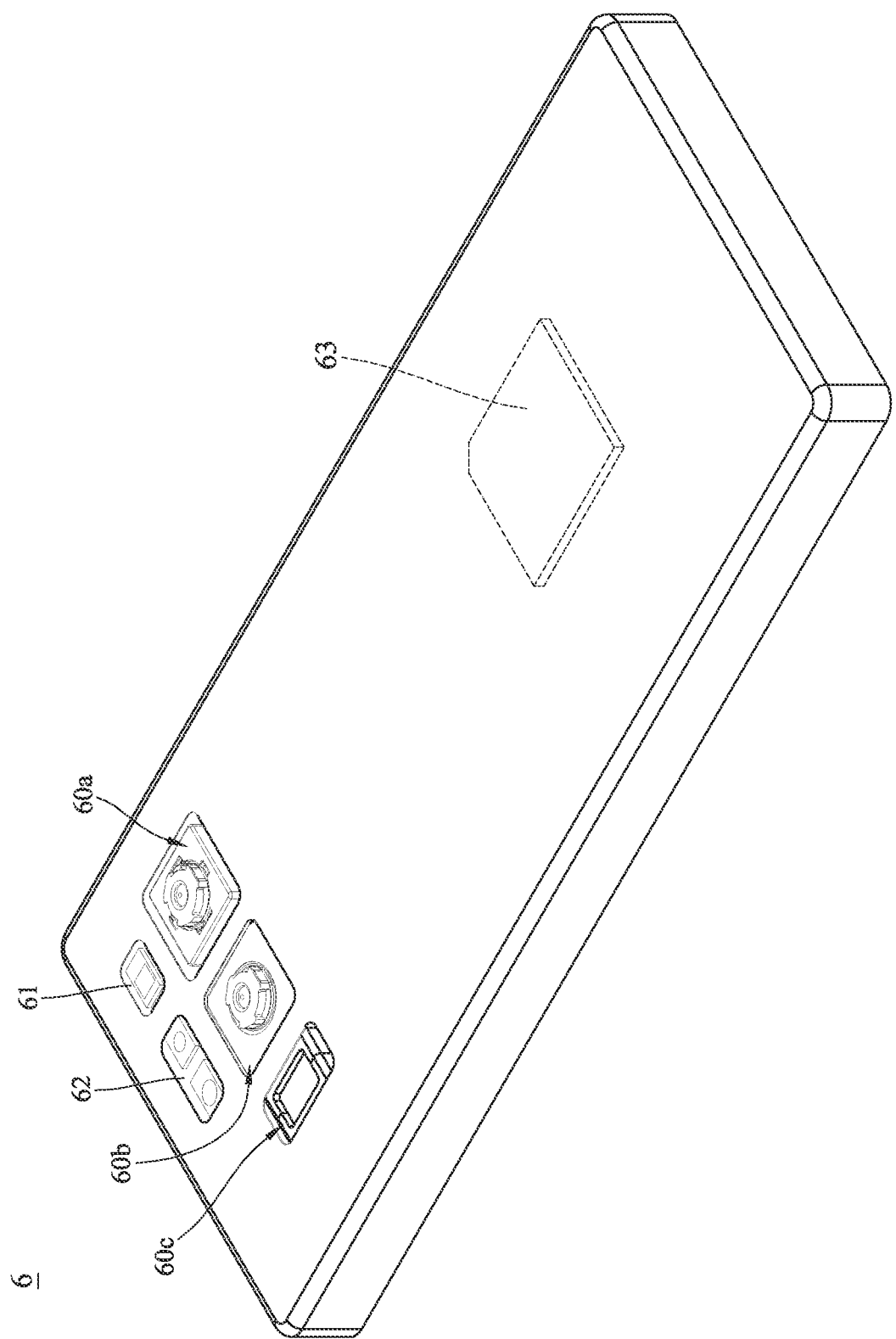
FIG. 17 is one perspective view of an electronic device according to the 6th embodiment of the present disclosure.
Figure 18:
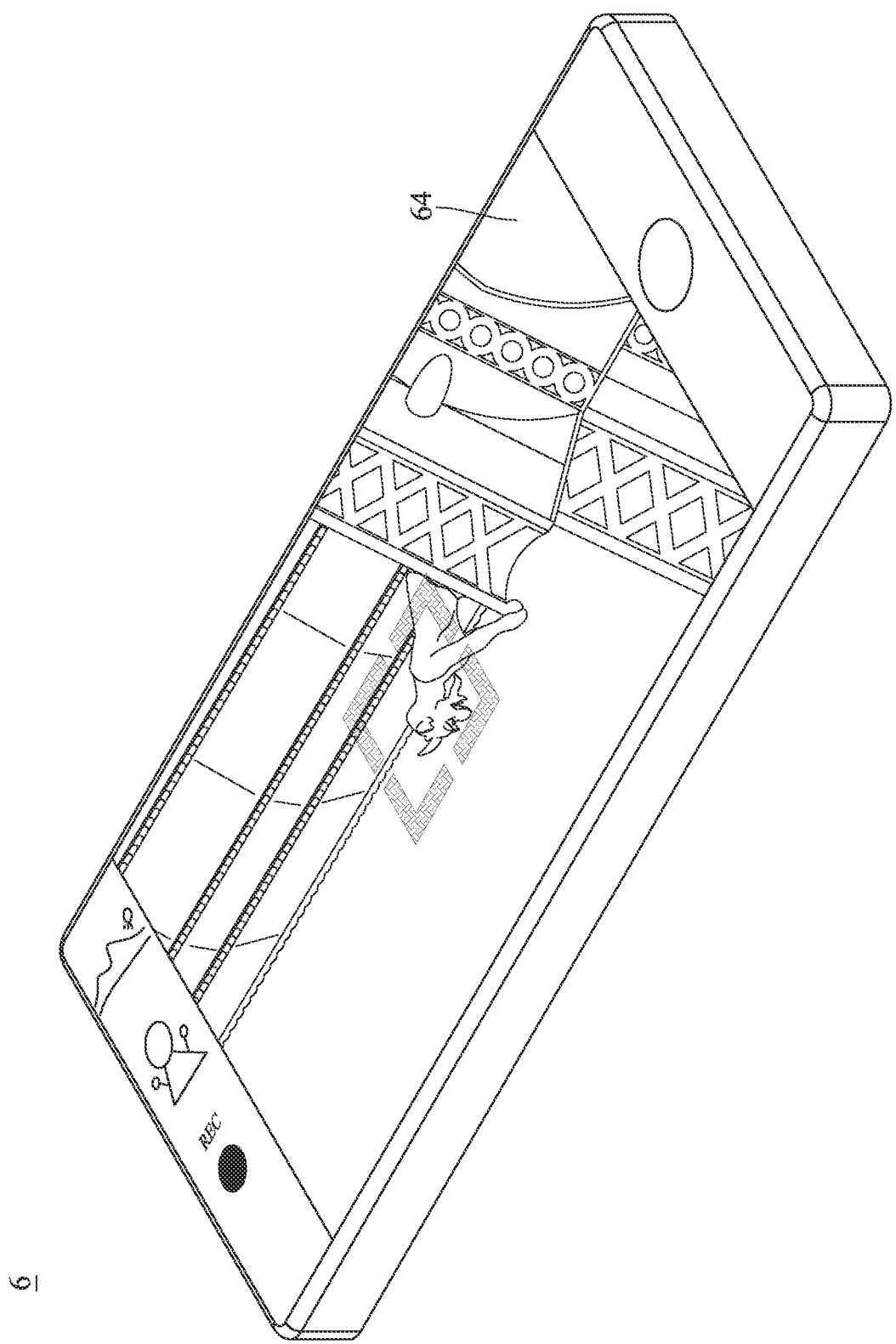
FIG. 18 is another perspective view of the electronic device in FIG. 17.

Please refer to FIG. 17 and FIG. 18. FIG. 17 is one perspective view of an electronic device according to the 6th embodiment of the present disclosure, and FIG. 18 is another perspective view of the electronic device in FIG. 17.

In this embodiment, the electronic device 6 is a smartphone including a plurality of camera modules, a flash module 61, a focus assist module 62, an image signal processor 63, a display module (user interface) 64 and an image software processor (not shown).

The camera modules include an ultra-wide-angle camera module 60a, a high pixel camera module 60b and a telephoto camera module 60c. Moreover, at least one of the camera modules 60a, 60b and 60c includes the imaging lens system of the present disclosure and an image sensor disposed on an image surface of the imaging lens system.

Figure 19:
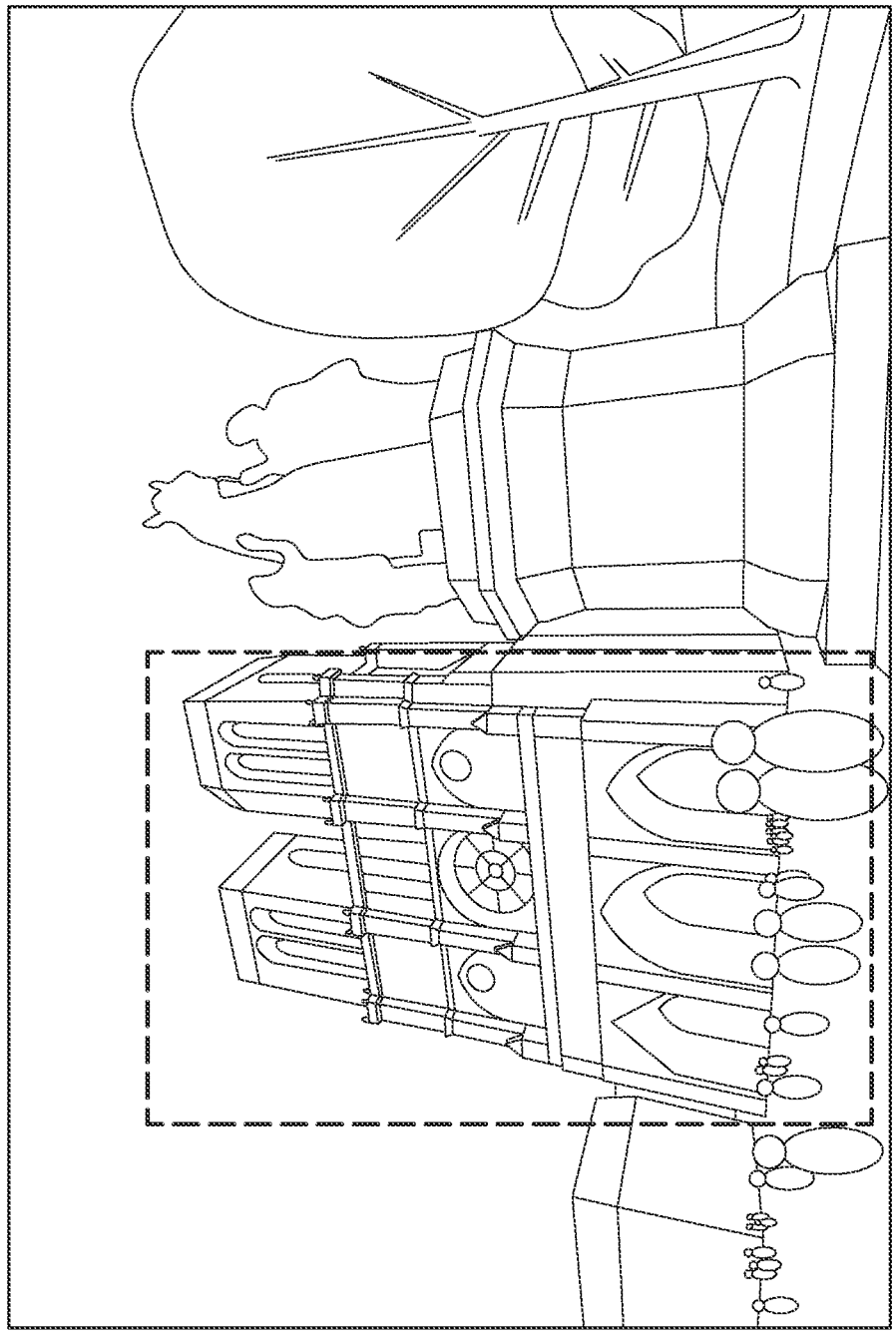
FIG. 19 is an image captured by an ultra-wide-angle camera module.

The image captured by the ultra-wide-angle camera module 60a enjoys a feature of multiple imaged objects. FIG. 19 is an image captured by the ultra-wide-angle camera module 560a.

Figure 20:
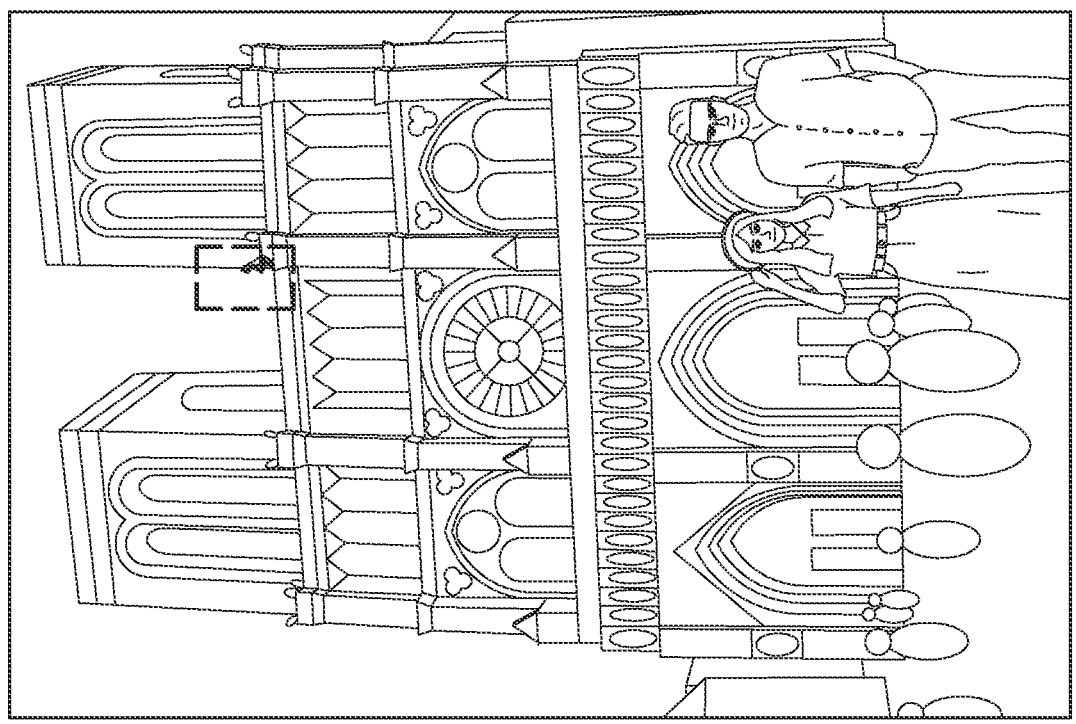
FIG. 20 is an image captured by a high pixel camera module.

The image captured by the high pixel camera module 60b enjoys a feature of high resolution and less distortion, and the high pixel camera module 60b can capture part of the image in FIG. 19. FIG. 20 is an image captured by the high pixel camera module 60b.

Figure 21:
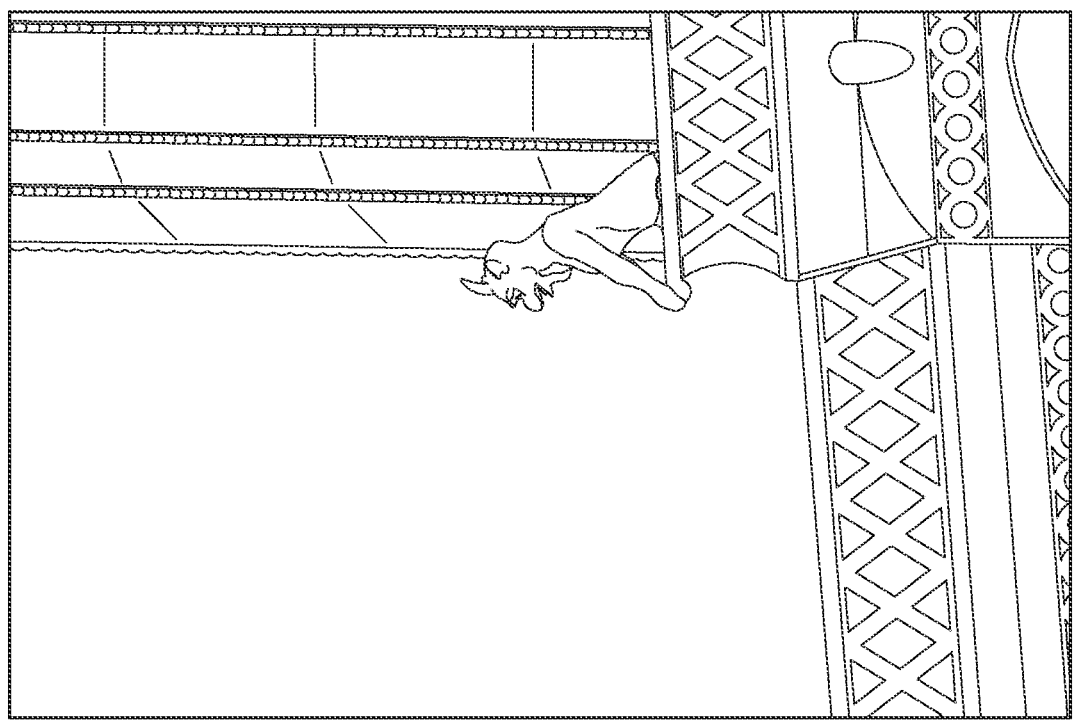
FIG. 21 is an image captured by a telephoto camera module.

The image captured by the telephoto camera module 60c enjoys a feature of high optical magnification, and the telephoto camera module 60c can capture part of the image in FIG. 20. FIG. 21 is an image captured by the telephoto camera module 60c. The maximum field of view (FOV) of the camera module corresponds to the field of view in FIG. 21.

When a user captures images of an object, the light rays converge in the ultra-wide-angle camera module 60a, the high pixel camera module 60b or the telephoto camera module 60c to generate images, and the flash module 61 is activated for light supplement. The focus assist module 62 detects the object distance of the imaged object to achieve fast auto focusing. The image signal processor 63 is configured to optimize the captured image to improve image quality and provided zooming function. The light beam emitted from the focus assist module 62 can be either conventional infrared or laser. The display module 64 can include a touch screen, and the user is able to interact with the display module 64 to adjust the angle of view and switch between different camera modules, and the image software processor having multiple functions to capture images and complete image processing. Alternatively, the user may capture images via a physical button. The image processed by the image software processor can be displayed on the display module 64.

7th Embodiment

Figure 22:
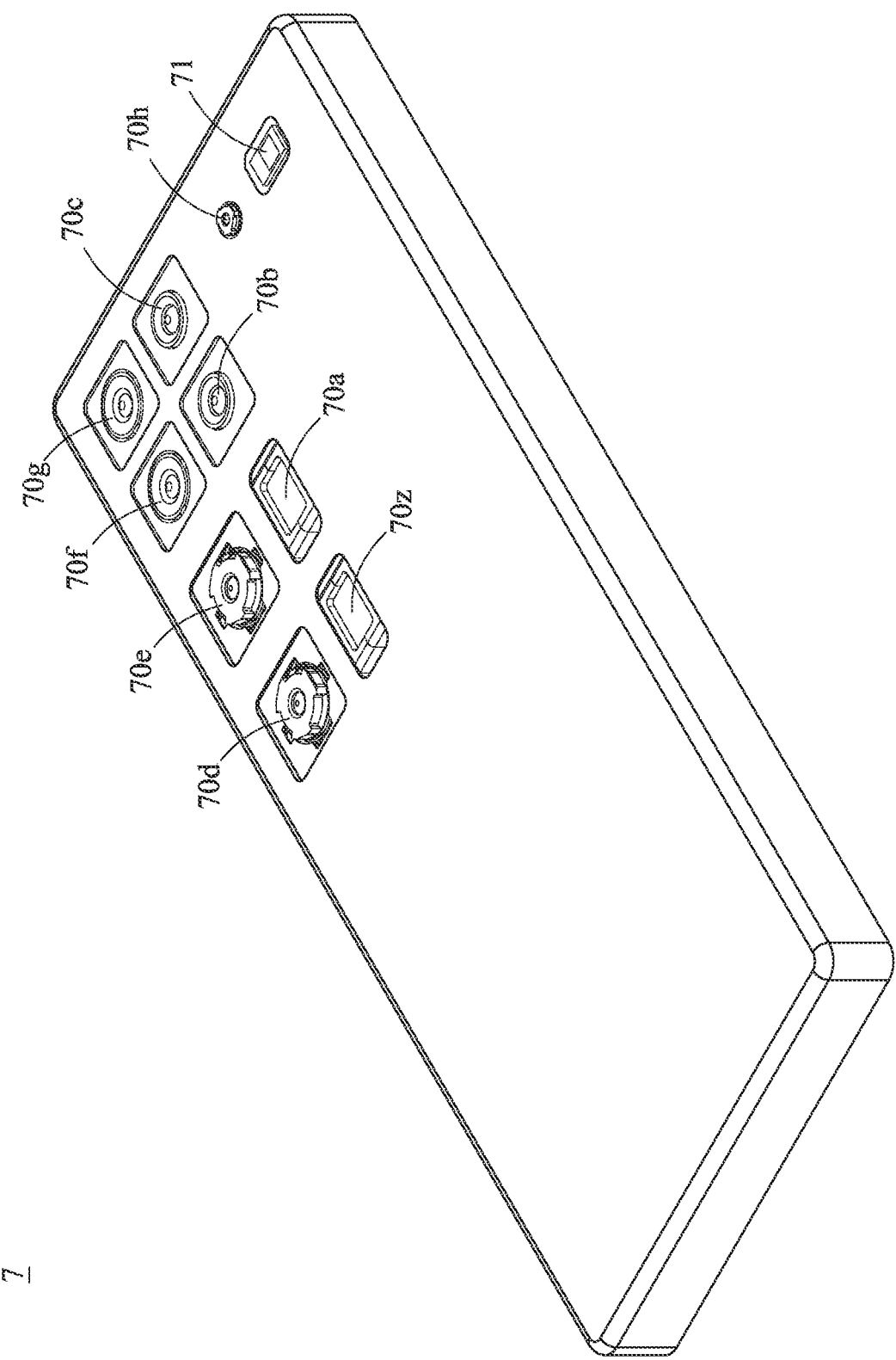
FIG. 22 is one perspective view of an electronic device according to the 7th embodiment of the present disclosure.

Please refer to FIG. 22, which is one perspective view of an electronic device according to the 7th embodiment of the present disclosure.

In this embodiment, the electronic device 7 is a smartphone including a camera module 70z, a camera module 70a, a camera module 70b, a camera module 70c, a camera module 70d, a camera module 70e, a camera module 70f, a camera module 70g, a camera module 70h, a flash module 71, an image signal processor, a display module and an image software processor (not shown). The camera module 70z, the camera module 70a, the camera module 70b, the camera module 70c, the camera module 70d, the camera module 70e, the camera module 70f, the camera module 70g and the camera module 70h are disposed on the same side of the electronic device 7, while the display module is disposed on the opposite side of the electronic device 7. At least one of the camera modules 70z, 70a, 70b, 70c, 70d, 70e, 70f, 70g and 70h includes the imaging lens system of the present disclosure and an image sensor disposed on an image surface of the imaging lens system.

The camera module 70z is a telephoto camera module, the camera module 70a is a telephoto camera module, the camera module 70b is a telephoto camera module, the camera module 70c is a telephoto camera module, the camera module 70d is a wide-angle camera module, the camera module 70e is a wide-angle camera module, the camera module 70f is an ultra-wide-angle camera module, the camera module 70g is an ultra-wide-angle camera module, and the camera module 70h is a ToF (time of flight) camera module. In this embodiment, the camera module 70z, the camera module 70a, the camera module 70b, the camera module 70c, the camera module 70d, the camera module 70e, the camera module 70f and the camera module 70g have different fields of view, such that the electronic device 7 can have various magnification ratios so as to meet the requirement of optical zoom functionality. In addition, the camera module 70z and the camera module 70a are telephoto camera modules having a light-folding element configuration. In addition, the camera module 70h can determine depth information of the imaged object. In this embodiment, the electronic device 7 includes a plurality of camera modules 70z, 70a, 70b, 70c, 70d, 70e, 70f, 70g, and 70h, but the present disclosure is not limited to the number and arrangement of camera module. When a user captures images of an object, the light rays converge in the camera modules 70z, 70a, 70b, 70c, 70d, 70e, 70f, 70g or 70h to generate an image(s), and the flash module 71 is activated for light supplement. Further, the subsequent processes are performed in a manner similar to the abovementioned embodiments, so the details in this regard will not be provided again.

8th Embodiment

Figure 23:
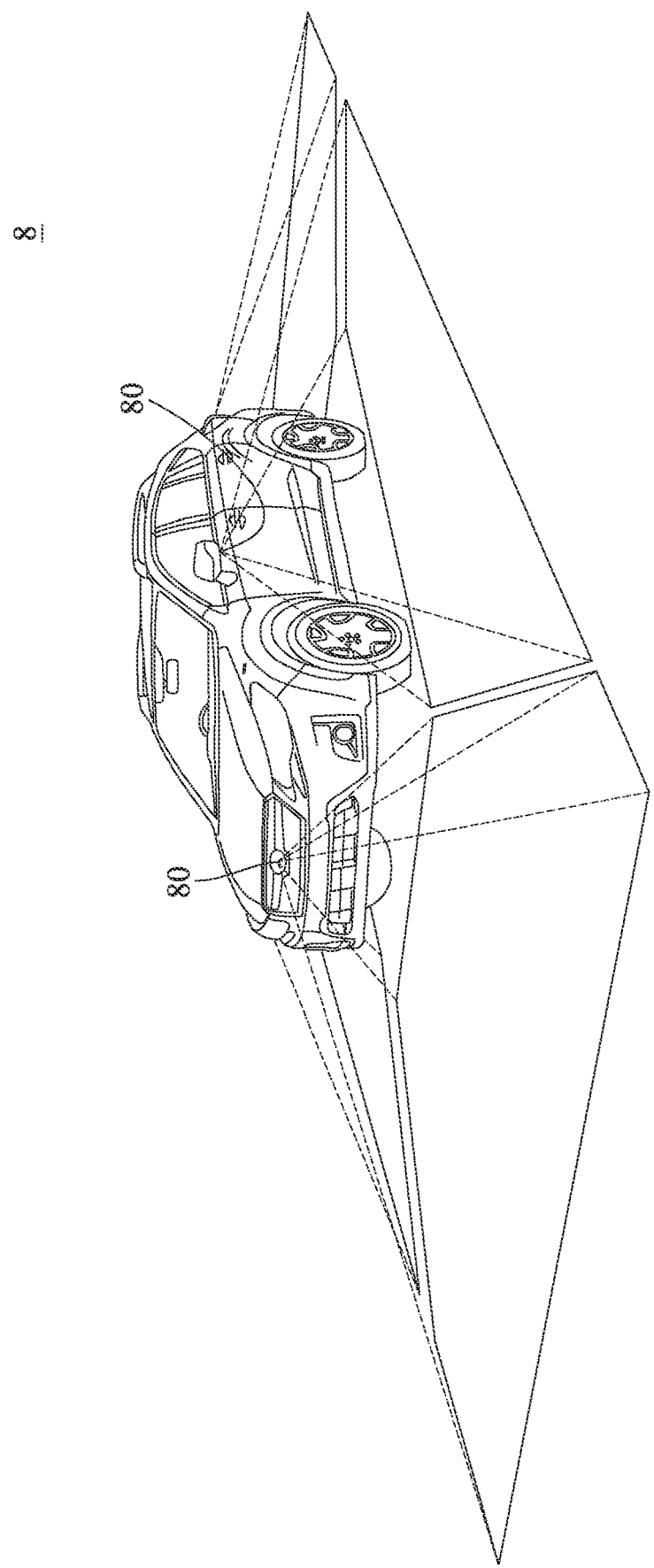
FIG. 23 is a perspective view of an electronic device according to the 8th embodiment of the present disclosure.
Figure 24:
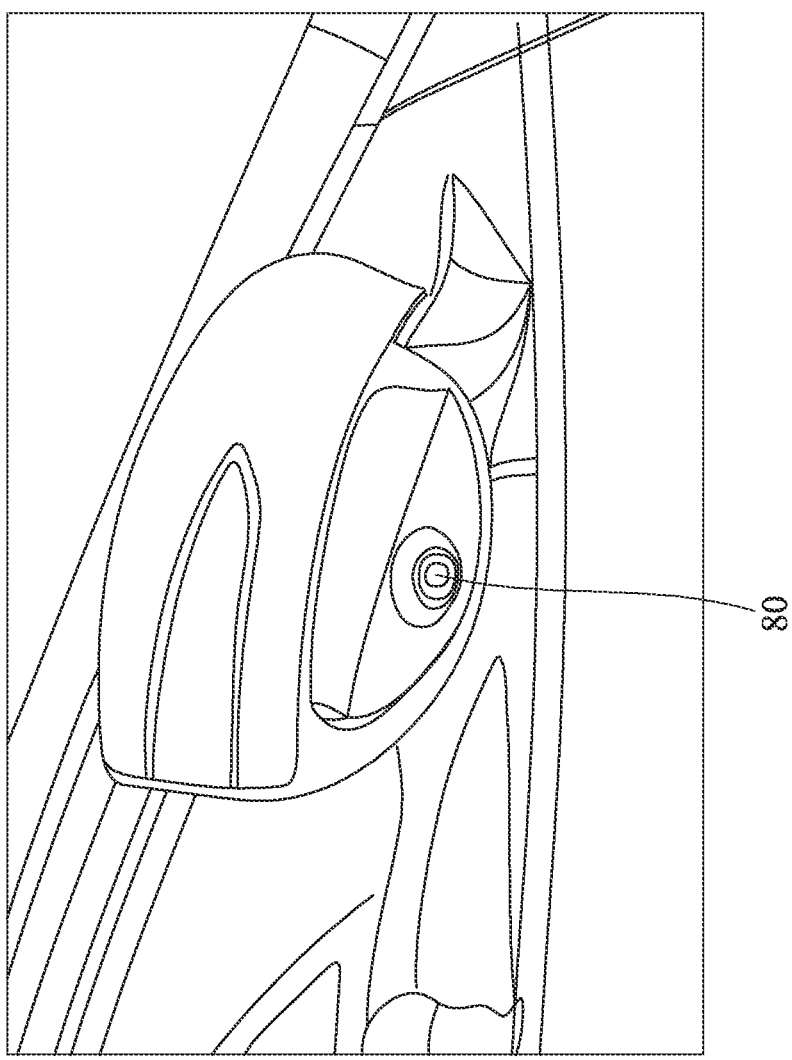
FIG. 24 is a partial view of the electronic device in FIG. 23.
Figure 25:
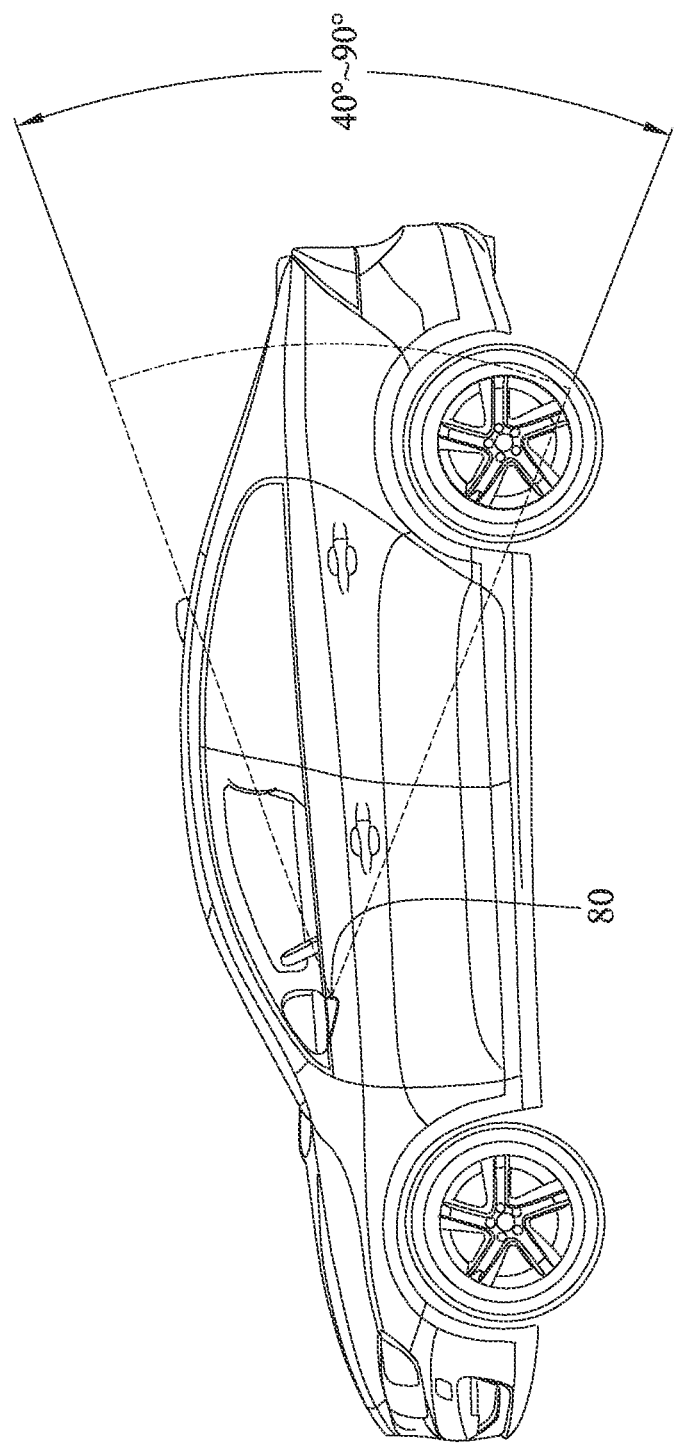
FIG. 25 is a side view of the electronic device in FIG. 23.
Figure 26:
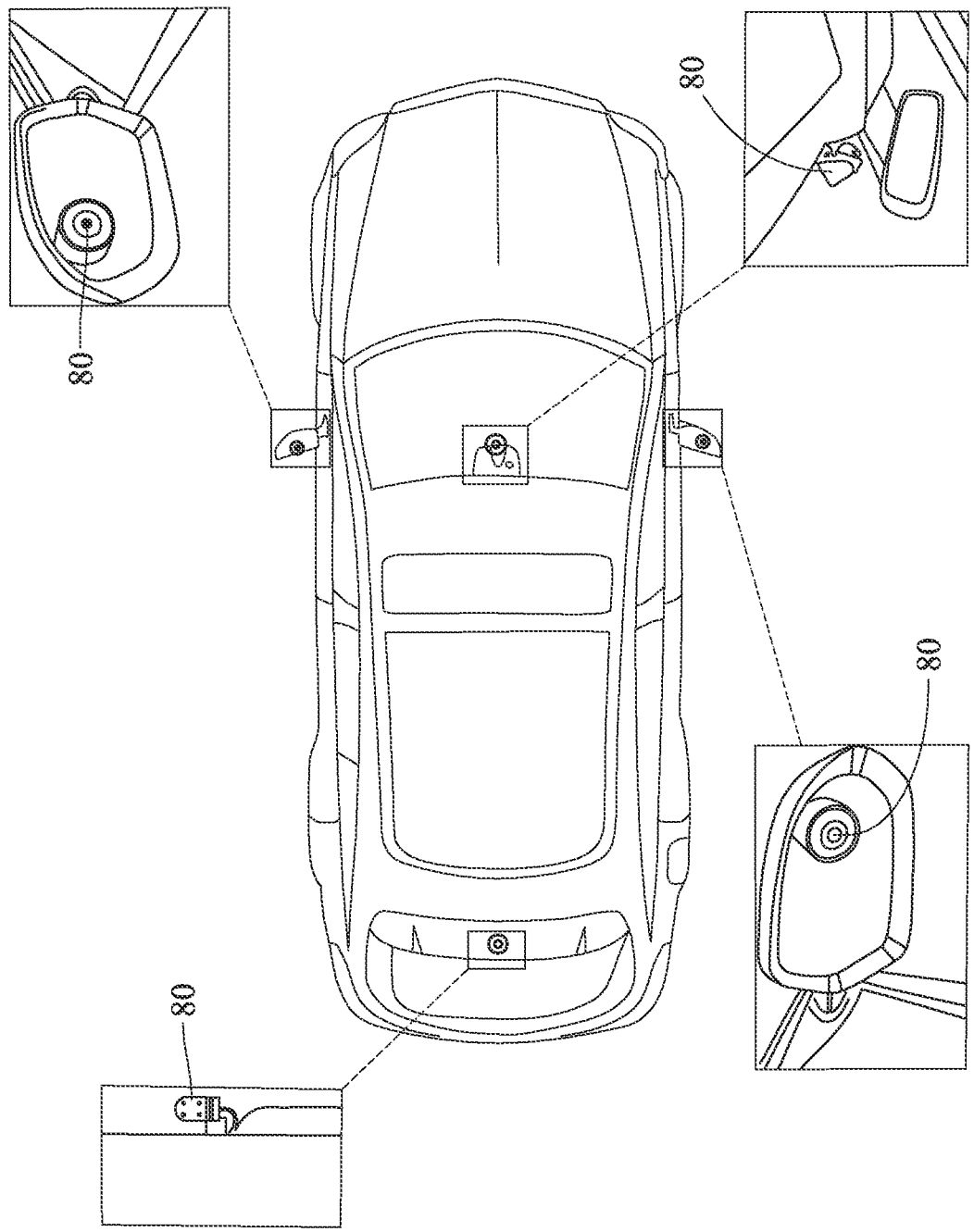
FIG. 26 is a top view of the electronic device in FIG. 23.

Please refer to FIG. 23 to FIG. 26. FIG. 23 is a perspective view of an electronic device according to the 8th embodiment of the present disclosure, FIG. 24 is a partial view of the electronic device in FIG. 23, FIG. 25 is a side view of the electronic device in FIG. 23, and FIG. 26 is a top view of the electronic device in FIG. 23.

In this embodiment, the electronic device 8 is an automobile. The electronic device 8 includes a plurality of automotive camera modules 80, and the camera modules 80, for example, each includes the imaging lens system of the present disclosure. The camera modules 80 can be served as, for example, panoramic view car cameras, dashboard cameras and vehicle backup cameras.

As shown in FIG. 23 and FIG. 24, the camera modules 80 are, for example, respectively disposed on the lower portion of the side mirrors, and the front and rear of the automobile to capture peripheral images of the automobile. The image software processor may blend the peripheral images into one panoramic view image for the driver's checking every corner surrounding the automobile, thereby favorable for parking and driving.

As shown in FIG. 25, the camera modules 80 are, for example, respectively disposed on the lower portion of the side mirrors. A maximum field of view of the camera modules 80 can be 40 degrees to 90 degrees for capturing images in regions on left and right lanes.

As shown in FIG. 26, the camera modules 80 can also be, for example, respectively disposed inside the side mirrors and the front and rear windshields for providing external information to the driver, and also providing more viewing angles so as to reduce blind spots, thereby improving driving safety.

The smartphones in the embodiments are only exemplary for showing the imaging lens system and the camera module of the present disclosure installed in an electronic device, and the present disclosure is not limited thereto. The imaging lens system and the camera module can be optionally applied to optical systems with a movable focus. Furthermore, the imaging lens system and the camera module feature good capability in aberration corrections and high image quality, and can be applied to 3D (three-dimensional) image capturing applications, in products such as digital cameras, mobile devices, digital tablets, smart televisions, network surveillance devices, multi-camera devices, image recognition systems, motion sensing input devices, wearable devices and other electronic imaging devices.

The foregoing description, for the purpose of explanation, has been described with reference to specific embodiments. It is to be noted that the present disclosure shows different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging lens system, comprising:
   a lens barrel element; and
   an imaging lens assembly, disposed on the lens barrel element, and the imaging lens assembly comprising, in order from an object side to an image side:
   a first imaging lens element, having a first image-side contact surface;
   a spacer element, having a second object-side contact surface and a second image-side contact surface, and the second object-side contact surface corresponding to the first image-side contact surface; and a second imaging lens element, having a third object-side contact surface, and the third object-side contact surface corresponding to the second image-side contact surface;
wherein the second imaging lens element comprises a mark structure, the mark structure is an annular tapering protrusion, the mark structure surrounds an optical axis of the imaging lens system, and the mark structure is located closer to the optical axis than the third object-side contact surface to the optical axis;
wherein the lens barrel element and the spacer element together form a buffer structure located farther away from the optical axis than the first image-side contact surface to the optical axis, and the buffer structure comprises:
  a first gap, wherein the first gap at least partially overlaps the third object-side contact surface in a direction parallel to the optical axis; and
  a second gap, wherein a step difference is between the first gap and the second gap, and the second gap is located closer to the optical axis than the first gap to the optical axis;
wherein a width of the first gap is g1, a width of the second gap is g2, and the following condition is satisfied:

$0.01 \leq g1/g2 \leq 0.9$.

2. The imaging lens system of claim 1, wherein the width of the first gap is g1, and the following condition is satisfied:

$g1 \leq 12 \ \mu m$.

3. The imaging lens system of claim 2, wherein the width of the first gap is g1, and the following condition is satisfied:

$g1 \leq 8 \ \mu m$.

4. The imaging lens system of claim 3, wherein the width of the first gap is g1, and the following condition is satisfied:

$g1 \leq 4.5 \ \mu m$.

5. The imaging lens system of claim 1, wherein an outer diameter of the first image-side contact surface is $\Phi o1$, an outer diameter of the second image-side contact surface is $\Phi o2$, and the following condition is satisfied:

$0.50 < \Phi o1/\Phi o2 < 0.90$.

6. The imaging lens system of claim 1, wherein the width of the first gap is g1, an inner diameter of the first image-side contact surface is $\Phi i1$, an inner diameter of the first gap is $\Phi g1$, and the following condition is satisfied:

$0.5 \leq 1000 \times g1/(\Phi g1 - \Phi i1) \leq 15$.

7. The imaging lens system of claim 1, wherein the first image-side contact surface is provided with a light absorption coating layer, and the light absorption coating layer is in physical contact with the spacer element.

8. The imaging lens system of claim 1, wherein the third object-side contact surface is provided with a light absorption coating layer, and the light absorption coating layer is in physical contact with the spacer element.

9. The imaging lens system of claim 1, wherein the mark structure is a demolded structure formed on the second imaging lens element after the second imaging lens element is removed from a shaping mold for manufacturing the second imaging lens element.

10. A camera module, comprising:
the imaging lens system of claim 1; and
an image sensor, disposed on an image surface of the imaging lens system.

11. An electronic device, comprising:
the camera module of claim 10.

12. An imaging lens system, comprising:
a lens barrel element; and
an imaging lens assembly, disposed on the lens barrel element, and the imaging lens assembly comprising, in order from an object side to an image side:
  a first imaging lens element, having a first image-side contact surface;
  a spacer element, having a second object-side contact surface and a second image-side contact surface, and the second object-side contact surface corresponding to the first image-side contact surface; and
  a second imaging lens element, having a third object-side contact surface, and the third object-side contact surface corresponding to the second image-side contact surface;
wherein the second imaging lens element comprises a mark structure, the mark structure is an annular tapering protrusion, the mark structure surrounds an optical axis of the imaging lens system, and the mark structure is located closer to the optical axis than the third object-side contact surface to the optical axis;
wherein the lens barrel element and the spacer element together form a buffer structure located farther away from the optical axis than the first image-side contact surface to the optical axis, and the buffer structure comprises:
  a first gap, wherein the first gap at least partially overlaps the third object-side contact surface in a direction parallel to the optical axis; and
  a second gap, wherein a step difference is between the first gap and the second gap, and the second gap is located closer to the optical axis than the first gap to the optical axis;
wherein an inner diameter of the first gap is $\Phi g1$, an outer diameter of the first image-side contact surface is $\Phi o1$, an outer diameter of the second image-side contact surface is $\Phi o2$, and the following condition is satisfied:

$0.3 < (\Phi g1 - \Phi o1)/(\Phi o2 - \Phi o1) < 0.9$.

13. The imaging lens system of claim 12, wherein the spacer element is a plastic spacer element, the spacer element is one-piece formed by injection molding process, and the spacer element further has at least two gate traces.

14. The imaging lens system of claim 13, wherein the spacer element comprises a liquid-crystal polymer.

15. The imaging lens system of claim 13, wherein the spacer element comprises a glass fiber.

16. The imaging lens system of claim 13, wherein the spacer element further has a plurality of strip groove structures, the strip groove structures extend from the second object-side contact surface to the second image-side contact surface, and the strip groove structures are regularly arranged around the optical axis.

17. The imaging lens system of claim 12, wherein the spacer element is a metal spacer element having a V-shaped groove recessed in a direction away from the optical axis.

18. The imaging lens system of claim 12, wherein a width of the first gap is g1, a width of the second gap is g2, and the following condition is satisfied:

$0.01 \leq g1/g2 \leq 0.9$.

19. The imaging lens system of claim 12, wherein a width of the first gap is g1, and the following condition is satisfied:

$g1 \leq 12 \ \mu m$.

20. The imaging lens system of claim 19, wherein the width of the first gap is g1, and the following condition is satisfied:

g1≤8 μm.

21. The imaging lens system of claim 20, wherein the width of the first gap is g1, and the following condition is satisfied:

g1≤4.5 μm.

22. The imaging lens system of claim 12, wherein the spacer element is metal spacer element, and at least one of the second object-side contact surface and the second image-side contact surface is provided with a light blocking sheet.

23. The imaging lens system of claim 12, wherein the outer diameter of the first image-side contact surface is Φo1, the outer diameter of the second image-side contact surface is Φo2, and the following condition is satisfied:

0.50<Φo1/Φo2<0.90.

24. The imaging lens system of claim 12, wherein a width of the first gap is g1, an inner diameter of the first image-side contact surface is Φi1, the inner diameter of the first gap is Φg1, and the following condition is satisfied:

0.5≤1000×g1/(Φg1−Φi1)≤15.

25. An imaging lens system, comprising:
a lens barrel element; and
an imaging lens assembly, disposed on the lens barrel element, and the imaging lens assembly comprising, in order from an object side to an image side:
  a first imaging lens element, having a first image-side contact surface;
  a spacer element, wherein the spacer element is a plastic spacer element, the spacer element is one-piece formed by injection molding process, the spacer element has a second object-side contact surface and a second image-side contact surface, and the second object-side contact surface corresponds to the first image-side contact surface; and
  a second imaging lens element, having a third object-side contact surface, and the third object-side contact surface corresponding to the second image-side contact surface;
wherein the lens barrel element and the spacer element together form a buffer structure, the buffer structure is located farther away from an optical axis of the imaging lens system than the first image-side contact surface to the optical axis, and the buffer structure comprises:
  a first gap, wherein the first gap at least partially overlaps the third object-side contact surface in a direction parallel to the optical axis; and
  a second gap, wherein a step difference is between the first gap and the second gap, and the second gap is located closer to the optical axis than the first gap to the optical axis;
wherein a width of the first gap is g1, an outer diameter of the first image-side contact surface is Φo1, an outer diameter of the second image-side contact surface is Φo2, and the following conditions are satisfied:

g1≤8 μm; and 0.50<Φo1/Φo2<0.90.

26. The imaging lens system of claim 25, wherein the width of the first gap is g1, and the following condition is satisfied:

g1≤4.5 μm.

27. The imaging lens system of claim 25, wherein the width of the first gap is g1, an inner diameter of the first image-side contact surface is Φi1, an inner diameter of the first gap is Φg1, and the following condition is satisfied:

0.5≤1000×g1/(Φg1−Φi1)≤15.

28. The imaging lens system of claim 25, wherein the spacer element has a plurality of strip groove structures, the strip groove structures extend from the second object-side contact surface to the second image-side contact surface, and the strip groove structures are regularly arranged around the optical axis.

* * * * *